United States Patent
Jaegal et al.

(10) Patent No.: US 10,932,124 B2
(45) Date of Patent: Feb. 23, 2021

(54) MOBILE TERMINAL

(71) Applicant: LG ELECTRONICS INC., Seoul (KR)

(72) Inventors: Chan Jaegal, Seoul (KR); Inshick Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/800,724

(22) Filed: Feb. 25, 2020

(65) Prior Publication Data

US 2020/0213835 A1 Jul. 2, 2020

Related U.S. Application Data

(63) Continuation of application No. 15/641,716, filed on Jul. 5, 2017, now Pat. No. 10,616,755.

(30) Foreign Application Priority Data

Jul. 5, 2016 (KR) .......................... 10-2016-0085025

(51) Int. Cl.
*H04W 8/22* (2009.01)
*H04L 29/08* (2006.01)
(Continued)

(52) U.S. Cl.
CPC .............. *H04W 8/22* (2013.01); *B60K 35/00* (2013.01); *G07C 5/085* (2013.01); *H04L 67/12* (2013.01);
(Continued)

(58) Field of Classification Search
None
See application file for complete search history.

(56) References Cited

U.S. PATENT DOCUMENTS

2013/0137415 A1 5/2013 Takikawa
2013/0303143 A1* 11/2013 Schrader ............... H04W 8/183
455/418
(Continued)

FOREIGN PATENT DOCUMENTS

CN 104793856 7/2015
CN 105187484 12/2015
(Continued)

OTHER PUBLICATIONS

Extended European Search Report in European Application No. 17001106.8, dated Sep. 22, 2017, 7 pages (with English translation).

*Primary Examiner* — German Viana Di Prisco
(74) *Attorney, Agent, or Firm* — Fish & Richardson P.C.

(57) ABSTRACT

Provided are a mobile terminal having a display, and particularly, to a mobile terminal capable of transmitting and receiving data to and from a vehicle and a system including the same. The mobile terminal includes a communication unit communicating with a vehicle having a vehicle display, and a controller receiving driving information from the vehicle using the communication unit, wherein the controller executes a certain function in response to occurrence of an event, selects any one execution screen, among a plurality of execution screens corresponding to the executed function, on the basis of the driving information, and transmits the any one execution screen to the vehicle through the communication unit so that the any one execution screen is output on the vehicle display.

20 Claims, 20 Drawing Sheets

(51) Int. Cl.
  *B60K 35/00* (2006.01)
  *G07C 5/08* (2006.01)
  *B60Q 9/00* (2006.01)
  *G05D 1/00* (2006.01)

(52) U.S. Cl.
  CPC .......... *B60K 2370/589* (2019.05); *B60Q 9/00* (2013.01); *G05D 1/0088* (2013.01)

(56) References Cited

U.S. PATENT DOCUMENTS

| | | |
|---|---|---|
| 2014/0156134 A1 | 6/2014 | Cullinane |
| 2014/0156182 A1* | 6/2014 | Nemec ................. B62D 1/28 701/430 |
| 2014/0188970 A1 | 7/2014 | Madhok |
| 2015/0094897 A1 | 4/2015 | Cuddihy et al. |
| 2016/0280234 A1 | 9/2016 | Reilhac |
| 2016/0355192 A1 | 12/2016 | James |
| 2017/0272943 A1* | 9/2017 | Valasek ............. H04W 12/0605 |
| 2018/0011551 A1 | 1/2018 | Gothlin |
| 2018/0056787 A1 | 3/2018 | Bonhoure |
| 2019/0061775 A1 | 2/2019 | Emura |

FOREIGN PATENT DOCUMENTS

| | | |
|---|---|---|
| JP | 2013115769 | 6/2013 |
| JP | 2014204242 | 10/2014 |
| WO | WO2015071035 | 5/2015 |

\* cited by examiner

< STOPPED >

< MANUAL DRIVING STATE >

< AUTONOMOUS DRIVING STATE >

< MANUAL DRIVING STATE >

< AUTONOMOUS DRIVING STATE >

< MANUAL DRIVING STATE >

251
720

< AUTONOMOUS DRIVING STATE >

722

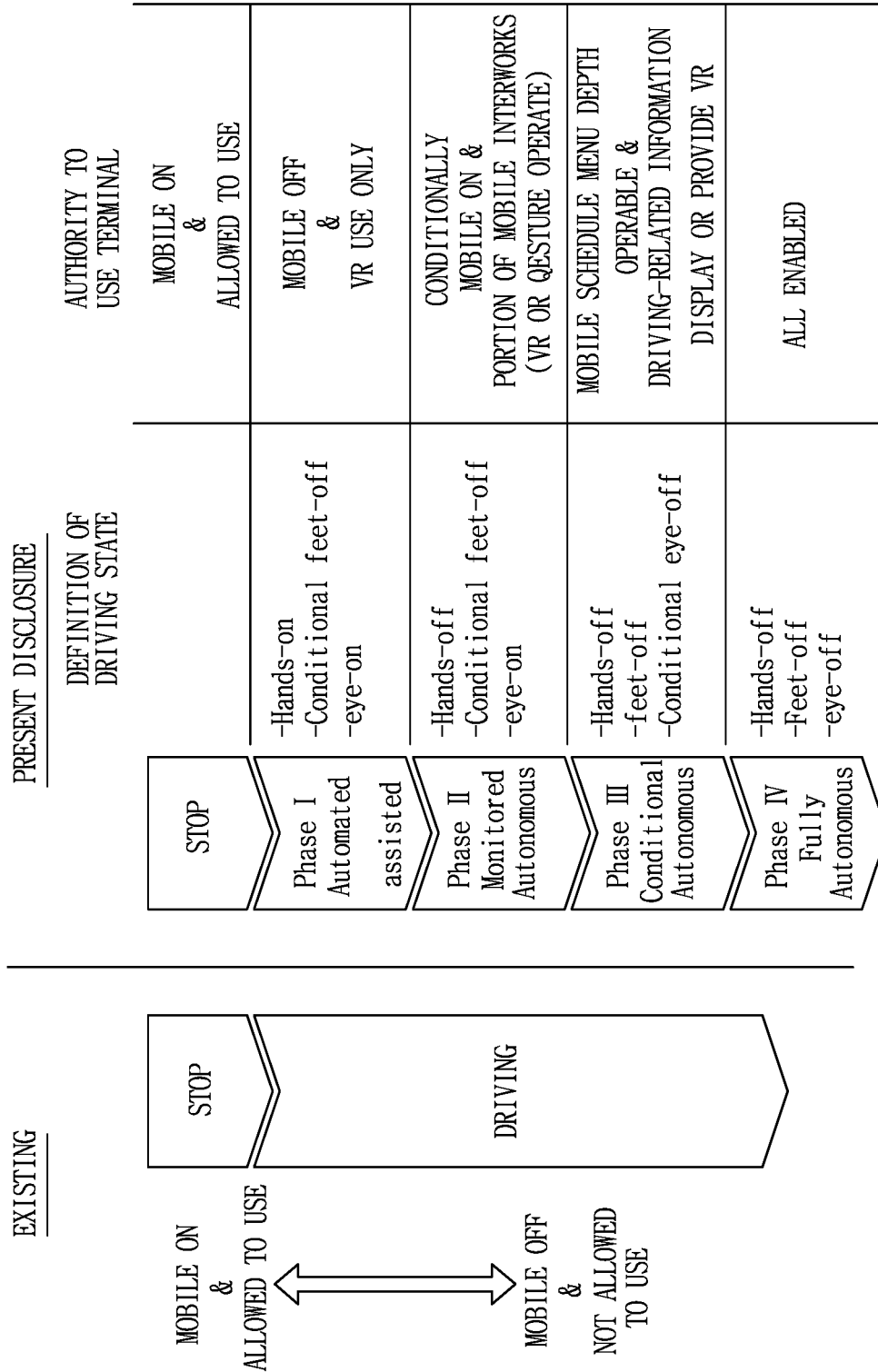

MOBILE TERMINAL

CROSS-REFERENCE TO RELATED APPLICATION

This application is a continuation of U.S. application Ser. No. 15/641,716, filed on Jul. 5, 2017, which claims the benefit of earlier filing date and right to priority to Korean Application No. 10-2016-0085025, filed on Jul. 5, 2016, the entire contents of which is incorporated by reference herein in its entirety.

TECHNICAL FIELD

The present disclosure relates to a mobile terminal having a display, and particularly, to a mobile terminal capable of transmitting and receiving data to and from a vehicle and a system including the same.

BACKGROUND

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to receive broadcast and multicast signals which permit viewing of content such as videos and television programs.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or a device.

Terminals are recognized as necessities of modern people, but the use of terminals is legally prohibited in some cases. For example, when a driver is driving a vehicle, the driver is prohibited from operating and using a mobile terminal, except for an exceptional situation requiring emergency. This is to prevent an accident that may occur as a driver's attention is distracted due to the use of a mobile terminal.

However, traffic accidents have frequently occurred due to the use of mobile terminals in spite of the legal limit, and users' needs to use mobile terminals during driving have increased.

In order to meet the users' needs, recently, terminals and vehicles which are connected to allow drivers to use functions of the terminals through the vehicles, and systems including the same have been developed. According to the recently developed system, when applications such as a call, a message, a map, and the like, installed in a mobile terminal is executed, an execution screen tor voice information thereof may be output through an electric/electronic component provided in a vehicle.

However, in order to allow functions of terminals to be executed in compliance with regulations, there are various limitations in functions executed in a vehicle. For example, only some preset applications, among various applications installed in a terminal, may be allowed to be executed or the number of letters included in an execution screen displayed on a vehicle display may be limited to be within a maximum value prescribed by regulations.

Restrictions of use of terminals during driving are to prevent a factor that may disturb driving in advance, and here, autonomous driving performed by a program even without a driver's intervention is introduced, mobile terminals may not be an obstacle to driving any longer.

Thus, terminals are required to be operated in different manners in a manual driving state in which a vehicle is driven by driver's intervention and an autonomous driving state in which the vehicle is driven by a program.

SUMMARY

Therefore, an aspect of the detailed description is to solve the aforementioned problems and any other problems.

Another aspect of the present disclosure provides a mobile terminal capable of enhancing driver convenience and preventing a traffic accident in a vehicle available for autonomous driving, and a control method thereof.

Another aspect of the present disclosure provides a mobile terminal capable of warning a user who uses a mobile terminal about a change in a driving situation during autonomous driving, and a control method thereof.

Another aspect of the present disclosure provides a mobile terminal capable of dividing a situation in which autonomous driving is performed into a plurality of stages and providing a user interface optimized for each stage, and a control method thereof.

To achieve these and other advantages and in accordance with the purpose of this specification, as embodied and broadly described herein, a mobile terminal may include: a communication unit communicating with a vehicle having a vehicle display; and a controller receiving driving information from the vehicle using the communication unit, wherein the controller executes a certain function in response to occurrence of an event, selects any one execution screen, among a plurality of execution screens corresponding to the executed function, on the basis of the driving information, and transmits the any one execution screen to the vehicle through the communication unit so that the any one execution screen is output on the vehicle display.

To achieve these and other advantages and in accordance with the purpose of this specification, as embodied and broadly described herein, a system including at least one mobile terminal as described above. The system may include: a vehicle control device installed in a vehicle having a vehicle display, collecting driving information of the vehicle, and controlling the vehicle display; and a mobile terminal receiving the driving information from the vehicle control device, wherein the mobile terminal executes a certain function in response to occurrence of an event, selects any one execution screen, among a plurality of execution screens corresponding to the executed function, on the basis of the driving information, and transmits the any one execution screen to the vehicle through the communication unit so that the any one execution screen is output on the vehicle display, and, when the anyone execution screen is received, the vehicle control device outputs the any one execution screen to the vehicle display.

The mobile terminal according to the present disclosure has the following advantages.

Since controlling is performed to optimize driver's convenience, while promoting safety, according to a driving state of a vehicle, driver's convenience may be increased and a traffic accident may be prevented in a vehicle available for autonomous driving.

Since a driver who uses a mobile terminal during autonomous driving is warned of a change in a driving situation, the driver may promptly switch to manual driving in an emergency situation.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 11 is a conceptual view illustrating a mobile terminal which divides an autonomous driving state into a plurality of modes and performs different operations according to respective modes.

DETAILED DESCRIPTION OF THE INVENTION

Figure 1A:
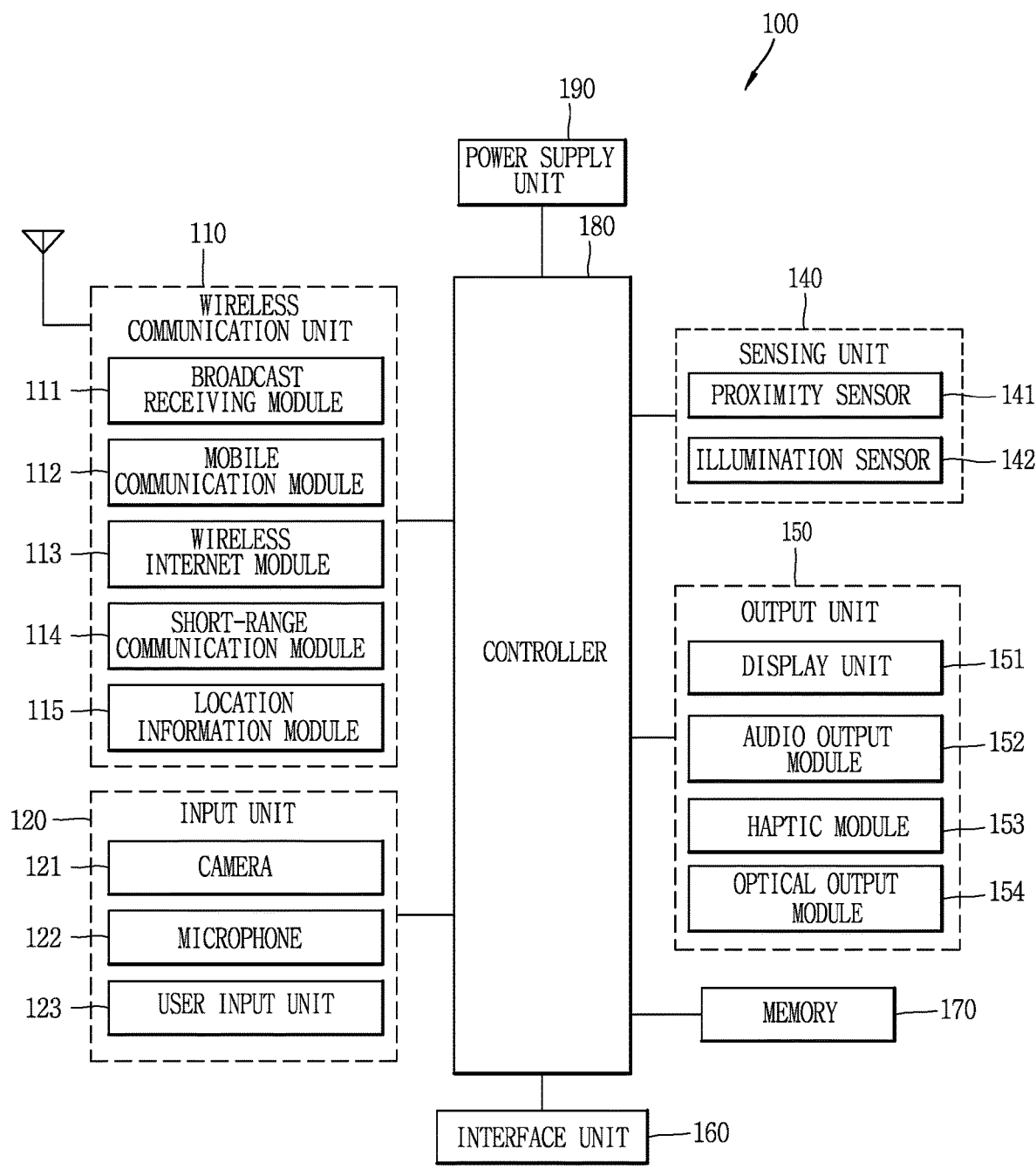
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
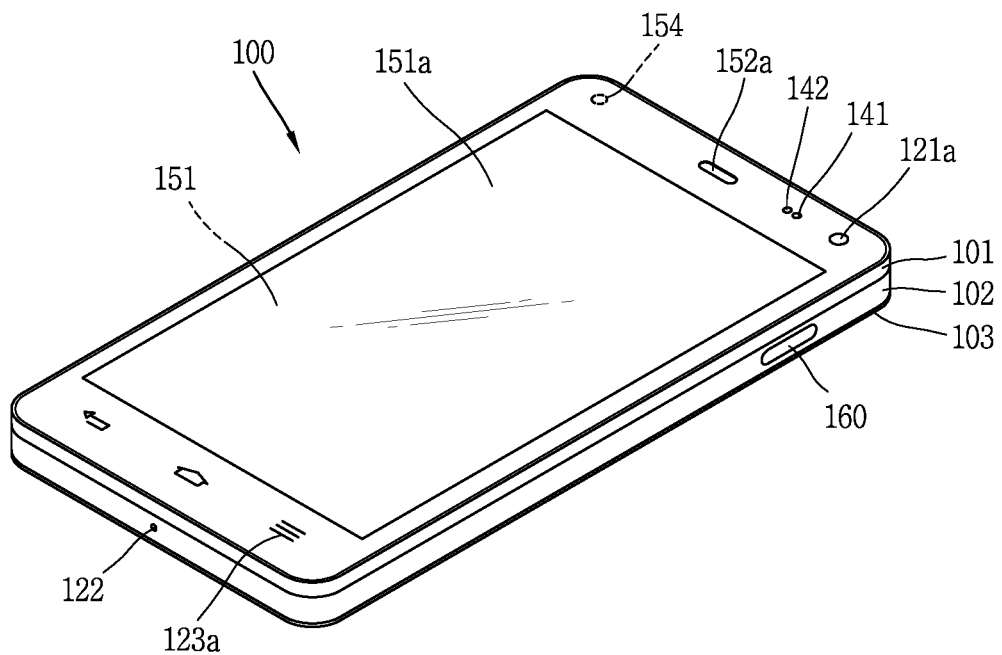
FIGS. 1B and 1C are conceptual views of one example of the mobile terminal, viewed from different directions.
Figure 1C:
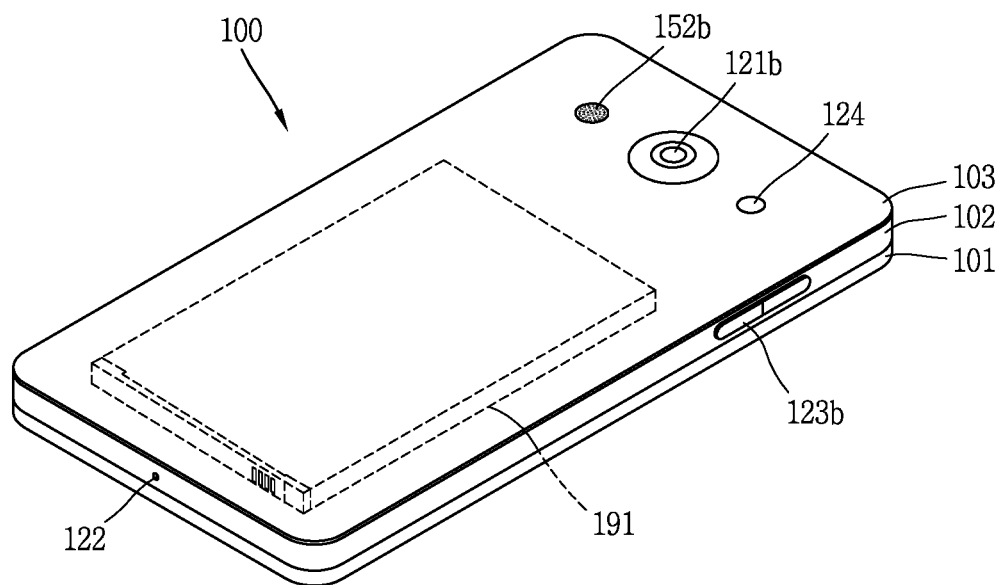

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a control unit 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1C. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the control unit 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a screen.

As a further alternative, the mobile terminal 100 may include a finger scan sensor which scans a user's fingerprint. The control unit 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Various embodiments described hereinafter may be implemented in a recording medium that can be read by a computer or a device similar thereto by using software, hardware, or a combination thereof.

Hereinafter, descriptions will be made with reference to the accompanying drawings in a clockwise direction or in order downwardly, with respect to a drawing provided on the left upper side.

Figure 2:
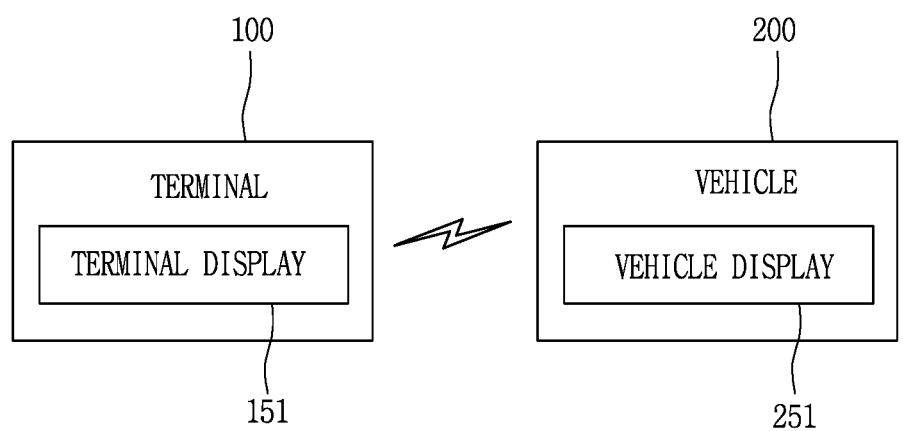
FIG. 2 is a block diagram illustrating a system according to an embodiment of the present disclosure.

FIG. 2 is a block diagram illustrating a system according to an embodiment of the present disclosure.

The system according to the present disclosure includes the mobile terminal (or the terminal 100) described above with reference to FIGS. 1A to 1C and a vehicle 200.

The terminal 100 includes a display, and hereinafter, the display included in the mobile terminal 100 will be referred to as a "terminal display" in order to be differentiated from a vehicle display 251 to be described hereinafter.

The vehicle 200 refers to a means of transportation capable of moving a person or luggage using kinetic energy. A typical example of the vehicle may be an automobile.

An operation of the vehicle 200 to be described hereinafter may be replaced by an operation of a control device of a vehicle. Here, the control device of a vehicle may be a device for electronically controlling at least one component provided in the vehicle 200 and may be, for example, an electronic control unit (ECU).

The vehicle 200 includes a vehicle display 251. The vehicle display 251 may have a screen, but is limited in output information according to regulations. For example, while the vehicle is driving, a play screen of video stored in a memory or received from a server in real time should not be displayed and the number of characters that may be displayed may be limited to a predetermined number or smaller. However, while the vehicle is stopped from driving or driving at a speed lower than a predetermined speed, such limitations are released and a driver may be provided with various types of information using the vehicle display 251.

The vehicle display 251 may include at least one of a dashboard display, a head-up display (HUD), and a center information display (CID).

Although not shown, the vehicle 200 further includes a communication unit (not shown).

The vehicle 200 may be connected to the terminal 100 through the communication unit wiredly/wirelessly and perform data communication.

When connection is established between the vehicle 200 and the terminal 100, the vehicle 200 may transmit information related to the vehicle display 251 to the terminal 100. For example, information basically required for the terminal 100 to use the vehicle display 251, such as a size, resolution, and a screen aspect ratio of the vehicle display 251, may be transmitted from the vehicle 200 to the terminal 100.

The terminal 100 may execute at least one of a plurality of applications installed therein and transmit related information to the vehicle 200 such that an execution screen of the executed application may be output on the vehicle display 251.

The application may be a concept including a widget, a home launcher, and the like, and refers to any type of program that can be driven in the terminal 100. Thus, the application may be a function of displaying a home screen page, a recently executed application list, a navigation, weather, radio, a web browser, audio play, video play, message transmission and reception, schedule management, a function of updating a program.

Since the terminal display 151 and the vehicle display 251 have different resolutions and aspect ratios, a terminal execution screen output on the terminal display 151 and a vehicle execution screen output on the vehicle display 251 may be different.

In addition, unlike a terminal execution screen, a vehicle execution screen is governed by regulations, and thus, output information is limited by regulations. For example, the number of entire characters included in a single screen is limited to a maximum value or smaller or video on a vehicle execution screen may be prohibited. This is to prevent an accident that may occur as a driver is distracted by a vehicle execution screen while driving.

Also, a vehicle execution screen may further include a new graphic object which is not included in a terminal execution screen. The new graphic object corresponds to a function executing an application installed in the vehicle 200, rather than the terminal 100. For example, the function may be associated with a function of adjusting a volume of an audio output unit installed in the vehicle, associated with a function of outputting a vehicle home screen internally stored in the vehicle, or may be associated with a function of operating an electric/electronic component of the vehicle.

In a specific application, the terminal 100 may have a terminal execution screen scheduled to be output on the terminal display 151 and a vehicle execution screen scheduled to be output on the vehicle display 251, stored therein.

In this case, when the terminal 100 outputs an execution screen of the specific application on the terminal display 151, the terminal 100 selects a terminal execution screen, and when the terminal 100 transmits the execution screen of the specific application to the vehicle so as to be output on the vehicle display 251, the terminal 100 may select a vehicle execution screen.

Also, the terminal 100 may newly create a vehicle execution screen using information received from the vehicle 200, that is, information related to the vehicle display 251. For example, the terminal 100 may edit a terminal execution screen scheduled to be output on the terminal display 151, on the basis of information related to the vehicle display 251.

The vehicle 200 outputs screen information on the vehicle display 251 on the basis of information received from the terminal 100. What is output on the vehicle terminal 251 corresponds to an execution screen of an application installed in the terminal 100. In order to allow the execution screen to be output on the vehicle display 251, the terminal 100 may transmit the execution screen itself to the vehicle 200 or may transmit a source code, an image, video, RGB, and the like, enabling an execution screen to be output.

Meanwhile, the vehicle 200 further includes a sensing unit (not shown).

The sensing unit may include at least one sensor for sensing at least one of information within the vehicle, surrounding environment information around the vehicle, and driver or passenger information of a driver or a passenger present in the vehicle.

For example, the sensing unit may include at least one of a proximity sensor, an illumination sensor, a touch sensor, an acceleration sensor, a magnetic sensor, a G sensor, a gyroscope sensor, a motion sensor, an RGB sensor, an infrared sensor, a fingerprint recognition sensor, an ultrasonic sensor, an optical sensor, a microphone, a battery gauge, an environment sensor (for example, a barometer, a hygrometer, a thermometer, a radiation detection sensor, a thermal sensor, and a gas sensor, and the like), and a chemical sensor (for example, an electronic nose, a health care sensor, a biometric sensor, and the like).

The vehicle 200 may combine pieces of information sensed by at least two or more sensors provided in the vehicle 200 to generate driving information. Here, the driving information refers to any type of information related to the vehicle sensed through the sensing unit.

The driving information may refer to information related to driving sensed by the vehicle itself and/or in a surrounding environment of the vehicle, such as whether the vehicle is stopped, a driving speed, a driving direction, a possibility of collision with a specific object, characteristics of a road in which the vehicle is driving (types of road such as unpadded road, expressway, crossroad, a curvature in a curved section, a speed limit set in a road, and the like).

The driving information may include position information such as a GPS, various types of information analyzed from an image captured by an image sensor, a possibility that an object sensed by a radar or lidar and the object collide, navigation information such as a starting point, a pass stop, or a destination.

Also, the driving information may include information regarding a driver or a passenger, that is, the number of drivers or passengers, gender of a driver or a passenger, a weight of a driver or a passenger, personal information related to a driver or a passenger.

In addition, the driving information may include driving mode information indicating a driving mode (or a driving state) of the vehicle.

The driving mode includes an autonomous driving mode and a manual driving mode.

The autonomous driving mode refers to a state in which at least one of acceleration and a moving direction of the vehicle 200 is changed or may be changeable by a program provided in the vehicle 200 and/or the terminal 100 without manipulation by a driver present in the driver's seat of the vehicle.

The autonomous driving mode defined herein corresponds to an embodiment of the present disclosure and the definition thereof may be variously modified according to an embodiment. For example, a case in which the vehicle is driven by remote controlling may also be defined as an autonomous driving mode.

The manual driving mode is defined as a state not in the autonomous driving mode, and may be varied according to a definition of the autonomous driving mode. For example, if the autonomous driving mode is defined as a state in which both acceleration and a driving direction are changed by a program, the manual driving mode may be defined as a state in which at least one of acceleration and a driving direction of the vehicle 200 is changed by a driver's input.

The terminal 100 performs communication with the vehicle 200 including the vehicle display 251 using a communication unit thereof, and may receive driving information generated by the vehicle 200.

The terminal 100 may perform different controlling on the basis of driving information received from the vehicle 200.

The terminal 100 according to an embodiment of the present disclosure may perform different controlling according to a driving mode of the vehicle. The driving mode of the vehicle may be divided into the autonomous driving mode and the manual driving mode as mentioned above.

First, a method for the terminal 100 and the vehicle 200 to interwork in the manual driving state will be described, and an operation performed by the terminal 100 in the autonomous driving state will be described in detail.

When the vehicle 200 is in the manual driving state, the terminal 100 performs different controlling according to whether the vehicle 200 is driving or stopped.

For example, when the vehicle 100 is driving, using the terminal 100 by the user is limited, but when the vehicle 100 is stopped, using the terminal 100 by the user is not limited.

For example, in the case of limitation of the use of the terminal 100, the terminal 100 may output a preset image limiting execution of a function according to a user input, like a locked screen, on the display unit 151. While the preset image is being output, even though a user input is applied, a function corresponding to the user input may not be executed.

Figure 3A:
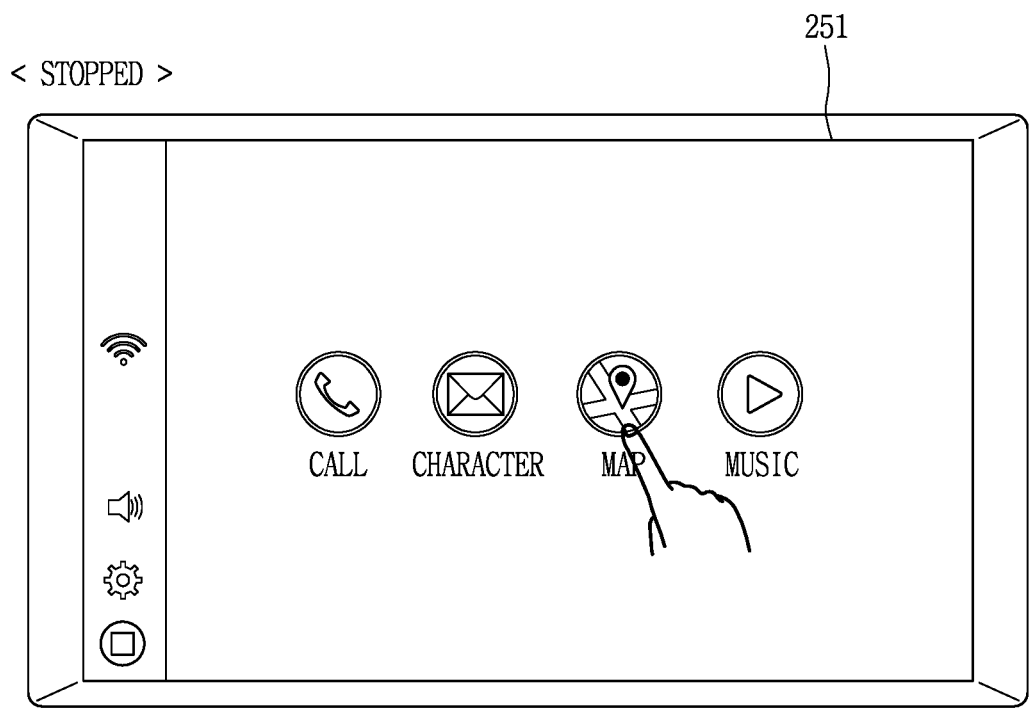
FIGS. 3A to 3C are views illustrating operations of a mobile terminal and a vehicle in a manual driving state.
Figure 3A:
Figure 3B:
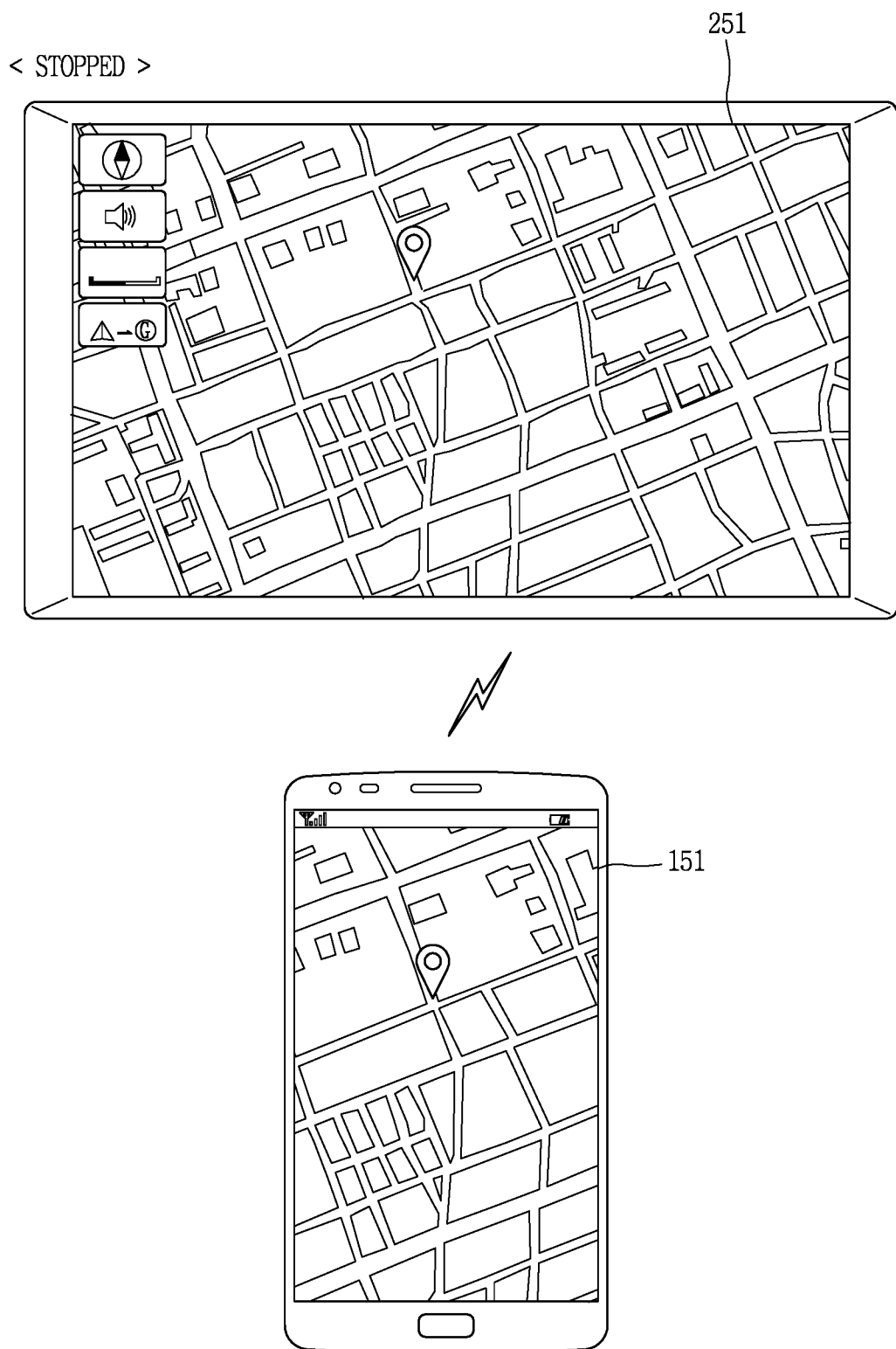
Figure 3C:
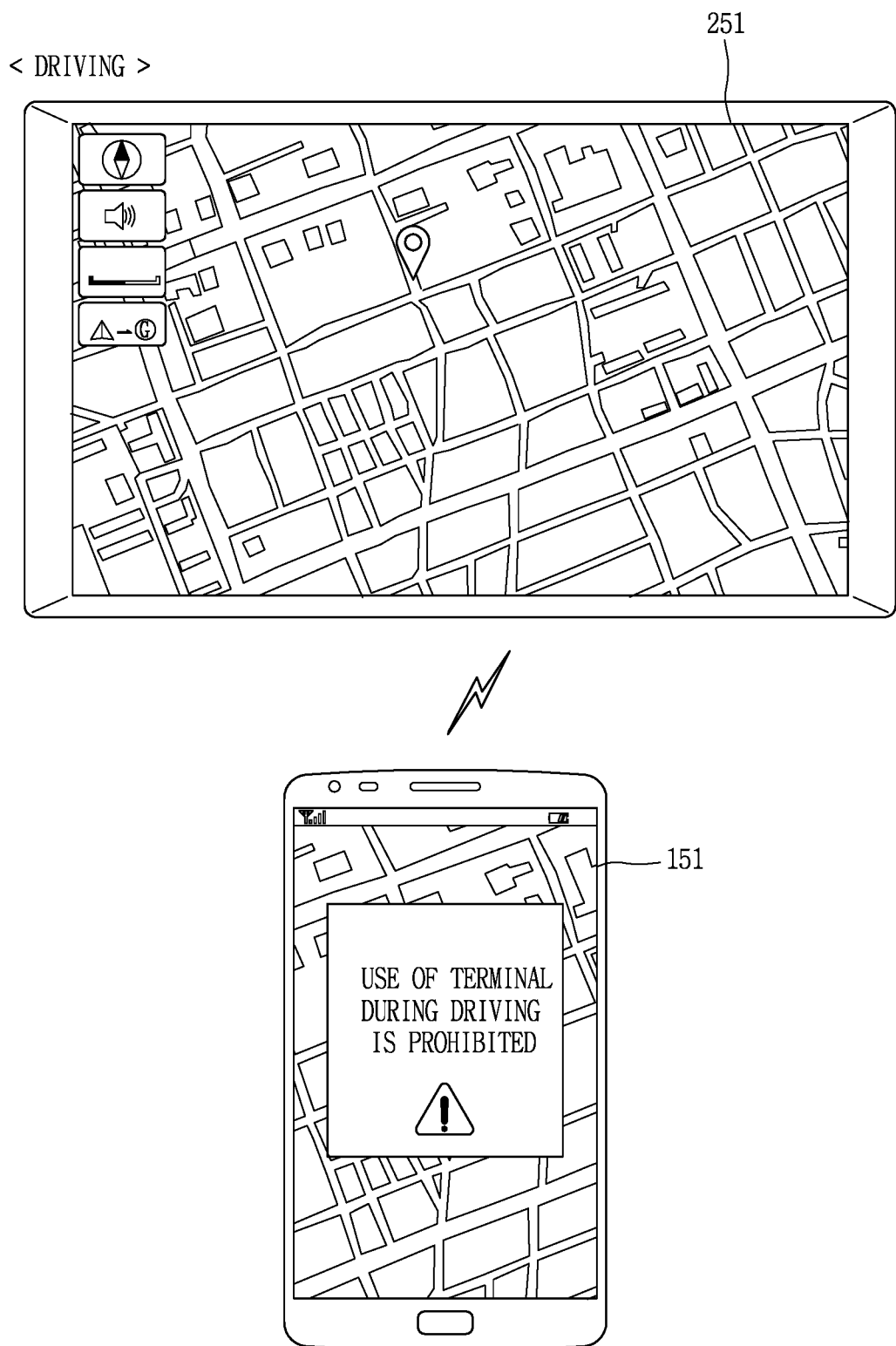

FIGS. 3A to 3C are views illustrating operations of a mobile terminal and a vehicle in a manual driving state.

When the terminal 100 is connected to the vehicle 200, the terminal 100 may transmit information related to a vehicle home screen page to the vehicle 200 such that the vehicle home screen page may be output on the vehicle display 251. The vehicle 200 outputs the vehicle home screen page using the information related to the vehicle home screen page received from the terminal 100.

The vehicle home screen page is differentiated from the terminal home screen page.

The terminal home screen page is output on the terminal display 151 and includes an execution icon of an application or a widget installed in the terminal 100 by the terminal user. In contrast, the vehicle home screen page includes an execution icon of at least one application and a widget whose execution screen may be output on the vehicle 200 among applications installed in the terminal 100.

The terminal home screen page and the vehicle home screen page commonly include an icon of an application and/or a widget installed in the terminal 100.

As for difference between the terminal home screen page and the vehicle home screen page, an icon of an application including a function limited under regulations is included in the terminal home screen page, but not in the vehicle home screen page. When an icon of a prohibited application is included in the vehicle home screen page, the corresponding icon may be deactivated even though a touch is applied thereto, such that the corresponding application is not executed. For example, the prohibited application may be a video play application including a video play function.

An application (hereinafter, referred to as a "vehicle application") corresponding to an execution icon included in the vehicle home screen page may be previously set by a terminal and/or a vehicle manufacturer. In addition, an execution icon of an existing vehicle application may be deleted from the vehicle home screen page, an execution icon of an application for a new vehicle may be added to a vehicle home screen page, or a display position of an execution icon may be changed in a home screen page of a vehicle, by a user of the terminal or a driver of the vehicle.

Meanwhile, the vehicle display 251 is configured as a touch screen including a touch sensor and a display. When a touch applied to the vehicle display 251 is sensed while a screen is being output on the vehicle display 251 on the basis of the information received from the terminal 100, the vehicle 200 may transmit coordinates of the sensed touch to the terminal 100.

For example, as illustrated in FIG. 3A, when a touch applied to a region in which an execution icon of a map application is displayed is sensed, touch coordinates of the sensed touch may be transmitted to the terminal 100. On the basis of the touch coordinates, the terminal 100 determines that the touch has been applied to the execution icon of the map application, and transmits related information to the vehicle 200 such that an execution screen of the map application is output on the vehicle display 251.

In other words, in response to the touch applied to the vehicle display 251, the terminal 100 may select a touch applied icon, among icons included in the vehicle home screen page, and execute the selected application. Also, the terminal 100 transmits a vehicle execution screen of the selected application to the vehicle 200.

On the basis of driving information received from the vehicle 200, the terminal 100 may determine whether the vehicle 200 is stopped, and may perform different controlling according to whether the vehicle 200 is stopped or driving.

Here, stopping may be defined as a state in which the vehicle 200 is stopped or moves at a speed lower than a predetermined speed. Driving is defined as a state in which the vehicle 200 moves at a speed higher than the predetermined speed. The predetermined speed may be varied according to regulations of each country and includes 0 km/h.

When the vehicle 200 is stopped, the terminal 100 may output a terminal execution screen of the selected application in response to the touch applied to the vehicle display 251 may be output on the terminal display 151 as illustrated in FIG. 3B. Thus, the user may use the selected application through the terminal display 151 as well as through the vehicle display 251.

In contrast, when the vehicle 200 is driving, the terminal 100 may output a preset image on the terminal display 151 or may turn off the terminal display 151 as illustrated in FIG. 3C. In a case in which the terminal display 151 was in an OFF state when the touch was applied to the vehicle display 251, the terminal 100 may be maintained in the OFF state as is.

The preset image may include notification information indicating that the use of the terminal is prohibited during driving.

As described above, the execution screen of the application installed in the terminal 100 may be output on the vehicle display 25, and the driver may use a function, which can be used in the terminal 100, through the vehicle 200 by applying a touch to the vehicle display 251.

Unlike a terminal execution screen, a vehicle execution screen follows traffic regulations, the driver may use functions of the terminal 100, while promoting safety.

Also, since the use of the terminal 100 is prohibited according to whether the vehicle is driving or not, traffic violation of the driver is blocked in advance.

Figure 4:
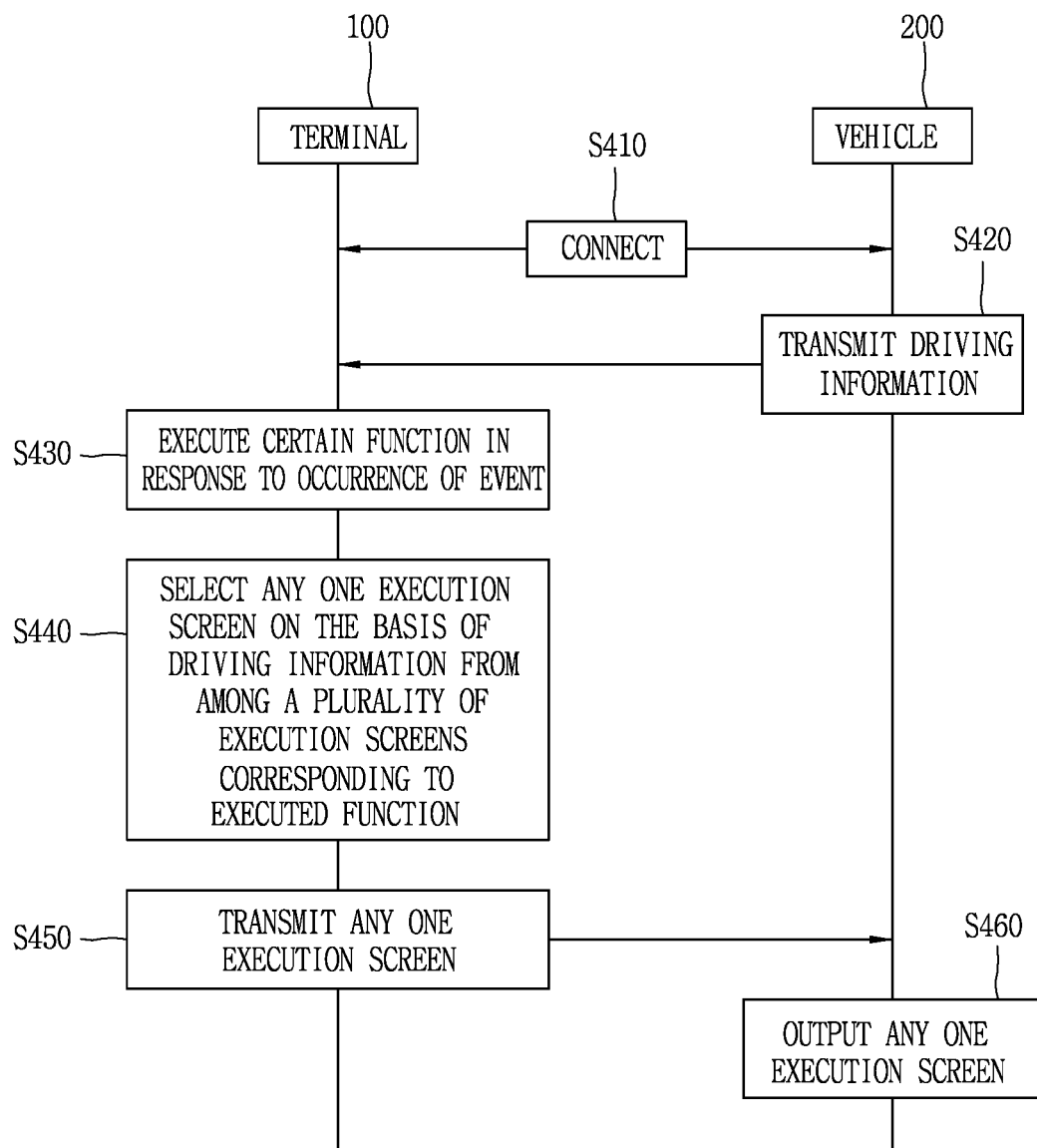
FIG. 4 is a flow chart illustrating operations of a mobile terminal and a vehicle in an autonomous driving state.

FIG. 4 is a flow chart illustrating operations of a mobile terminal and a vehicle in an autonomous driving state.

First, a connection is established between the terminal 100 and the vehicle 200 (S410).

The connection may be made wiredly or wirelessly such as Bluetooth. In order to prevent hacking or an erroneous connection by a third party, at least one of the terminal 100 or an the vehicle 200 may request input of a password before the connection is established. For example, a locked image formed to receive a password before the terminal 100 and the vehicle 200 are connected may be output on the terminal display 151 and/or the vehicle display 251.

When the terminal 100 and the vehicle 200 are connected, a screen transmitted from the terminal 100 may be output on the vehicle display 251. That is, when the terminal 100 and the vehicle 200 are connected, a screen output on the vehicle 251 may be varied according to a screen transmitted from the terminal 100.

Meanwhile, the terminal 100 transmits different screens to the vehicle 200 according to a driving state. For example, in a case in which the vehicle 200 is driving in a manual driving state, a screen the vehicle display 251 limited under regulations is to be output, and in a case in which the vehicle 200 is driving in an autonomous driving state, various screens may be output on the vehicle display 251 without restrictions. In order to cause an appropriate screen to be output on the vehicle display 251, the terminal selects any one screen to be transmitted to the vehicle 200 on the basis of a driving state.

Hereinafter, operations of the terminal 100 and the vehicle 200 according to a driving state of the vehicle 200 will be described in detail.

When a connection is established, the vehicle 200 may transmit driving information to the terminal 100 (S420).

The vehicle 200 transmits driving information sensed or generated by the vehicle 200 to the terminal 100 periodically or occasionally. Whenever driving information is generated, the vehicle 200 may transmit the driving information to the terminal 100 in real time. Here, the driving information refers to any type of information related to the vehicle and/or surroundings of the vehicle, and may include information sensed by a sensing unit provided in the vehicle, information generated by the vehicle on the basis of the information sensed by the sensing unit, and information provided to the vehicle through a server.

Thereafter, the terminal 100 may execute any one function in response to occurrence of an event (S430).

Occurrence of an event may be a case in which a user input is applied to the terminal 100, a case in which there is an absent call, a case in which there is an application to be updated, a case in which a message is received, a case in which a display activation key (an LCD awake key or a home key) is pressed, alarm, an incoming call, a missed call notification, and the like.

In another example, when specific information is received through the wireless communication unit of the terminal, it means that an event has occurred in an application related to the specific information, and the controller senses that.

When the display activation key is pressed, a function of displaying a recently executed screen or a function of displaying a home screen page may be executed. When a touch is applied to an icon of a home screen page, an application corresponding to the icon may be executed. In this manner, different functions are executed according to types of event, and different screens are displayed on the terminal display 151.

Thereafter, any one execution screen is selected on the basis of driving information among a plurality of execution screens corresponding to the executed to function (S440), and the any one execution screen is transmitted to the vehicle 200 (S450). The vehicle 200 outputs execution screen transmitted from the terminal 100 to the vehicle display 251 (S460).

Although the same function is executed according to occurrence of an event, different execution screens may be selected according to driving information of the vehicle 200.

In detail, when driving information satisfies a first condition, the terminal 100 may select a first execution screen corresponding to the first condition among the plurality of execution screens corresponding to the executed function, and when the driving information satisfies a second condition, the terminal 100 selects a second execution screen different to the first execution screen, from among the plurality of execution screens. Any one of the first and second execution screens is selectively output on the vehicle display 251.

Here, the first condition may refer to a manual driving state in which the vehicle 200 is driving according to user's operation, and the second condition may refer to an autonomous driving state in which the vehicle 200 is driving according to a program provided in the vehicle 200 and/or the terminal 100.

In detail, the autonomous driving state refers to a state in which at least one of acceleration and a moving direction of the vehicle 200 is changed or changeable by a program provided in the vehicle 200 and/or the terminal 100 even without a driver's operation.

The manual driving state refers to a state which is not the autonomous driving state. Thus, a definition of the manual driving state may be changed according to how the autonomous driving state is defined.

The vehicle 200 may directly transfer a driving state thereof to the terminal 100. Or, the vehicle 200 may transmit only driving state thereof and the terminal 100 may determine a driving state of the vehicle 200 on the basis of the transmitted driving information.

In a state in which the driving information satisfies the first condition, when the driving information is changed to satisfy the second condition, an execution screen transmitted to the vehicle 200 is changed from the first execution screen to the second execution screen. That is, in a state in which the first execution screen is transmitted to the vehicle 200, when the driving information is changed to satisfy the second condition, the second execution screen, instead of the first execution screen, is transmitted to the vehicle 200.

Meanwhile, different execution screens regarding the same function may be stored in the memory of the terminal 100 or stored in a preset server. Or, a reference execution screen may be stored in the memory or the server, and the terminal 100 may edit the reference execution screen according to driving information to generate different execution screens.

Among execution screens regarding a specific function, an execution screen output on the terminal display 151 will be referred to as a "terminal execution screen". An execution screen output on the vehicle display 251 in the manual driving state will be referred to as a "vehicle execution screen for manual driving", and an execution screen output on the vehicle display 251 in the autonomous driving state will be referred to as a "vehicle execution screen for autonomous driving". The "vehicle execution screen" described above with reference to FIG. 2 includes the vehicle execution screen for manual driving and the vehicle execution screen for autonomous driving.

Here, the vehicle execution screen for manual driving is a vehicle execution screen configured to satisfy restrictions under regulations during manual driving, and the vehicle execution screen for autonomous driving is a vehicle execution screen including information for the user to receive in relation to autonomous driving in the autonomous driving situation.

The vehicle execution screen for manual driving is configured such that a driver is prevented from being distracted by the vehicle display 251 in the vehicle 200 and a screen output on the vehicle display 251 satisfies restrictions stipulated by regulations. For example, video may be excluded from the vehicle execution screen for manual driving, or although a link connected to video is included in the vehicle execution screen for manual driving, playing of the video may be limited.

The vehicle execution screen for autonomous driving is configured such that a driver freely uses a screen output on the vehicle display 251 in the vehicle 200 during autonomous driving and checks information related to the vehicle 200.

For example, at least one of a destination, a driving speed, a driving direction, a remaining amount of fuel, and a possibility of a collision of the vehicle 200 in the autonomous driving state, a time left for manual driving, and a distance to go for manual driving may be included in the vehicle execution screen for autonomous driving.

In addition, the vehicle execution screen for autonomous driving may include a graphic object associated with the vehicle 200 and/or a control function of an electric/electronic component provided in the vehicle 200. For example, graphic objects such as adjustment of a height of a window corresponding to a specific seat, a target temperature of an air-conditioner and adjustment of an air volume of the air-conditioner, adjustment of a volume, setting of a destination or a stop of the vehicle 200, setting a parking place, and the like, may be included in the vehicle execution screen for autonomous driving. Through this, the driver may control the vehicle 200 by using the mobile terminal 100, while using the terminal 100.

The vehicle execution screen for manual driving and the vehicle execution screen for autonomous driving will be described in more detail with reference to FIGS. 5 to 9D.

Meanwhile, while the any one execution screen is being output on the vehicle display 251, a touch may be applied to the terminal display 151 or the vehicle display 251. In this case, the terminal 100 may search for a graphic object corresponding to coordinates in any one execution screen. When a graphic object is searched, the terminal 100 executes a function corresponding to the searched graphic object, and here, the steps S430 to S460 are performed.

Figure 5:
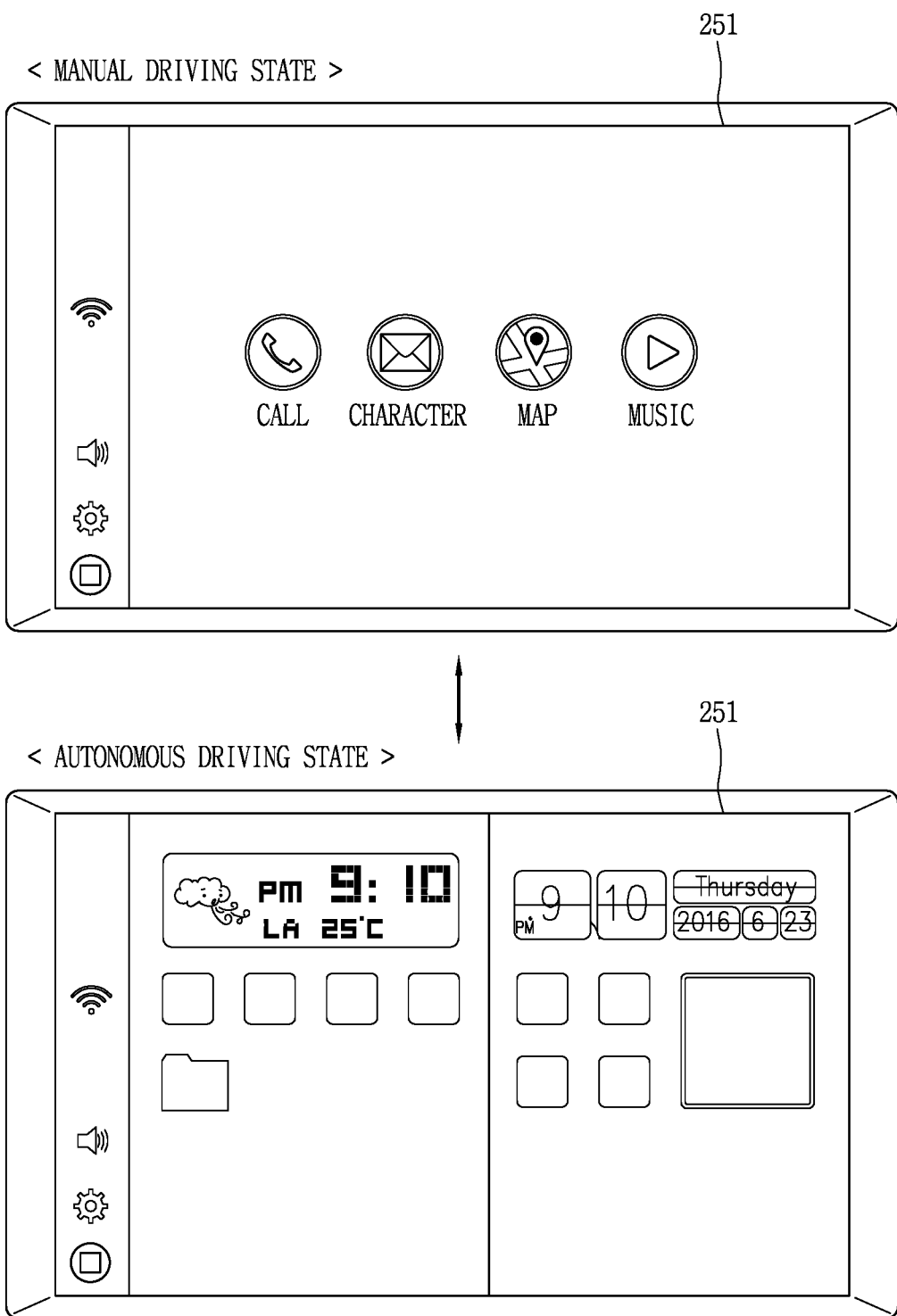
FIG. 5 is a view illustrating an embodiment of outputting a home screen page according to a control method of FIG. 4.

FIG. 5 is a view illustrating an embodiment of outputting a home screen page according to a control method of FIG. 4.

When the vehicle 200 and the terminal 100 are connected, the terminal 100 may transmit a vehicle home screen page to the vehicle 200 so that the driver may use an application installed in the terminal 100 through the vehicle display 251. The vehicle 200 outputs the received vehicle home screen page on the vehicle display 251.

Here, the terminal 100 may selectively transmit a home screen page for manual driving or a home screen page for autonomous driving to the vehicle 200 according to a driving state of the vehicle 200. In other words, in the case of manual driving, the home screen page for manual driving may be displayed on the vehicle display 251, and in the case of the autonomous driving, the home screen page for autonomous driving may be displayed on the vehicle display 251.

Types and the number of execution icons included in the home screen page for manual driving are limited. In detail, an execution icon included in the home screen page for manual driving are matched to one or more applications that may be limitedly executed during manual driving, among applications installed in the terminal 100. For example, an execution icon of a preset application such as a call, a message, a map, or music play may be included in the home screen page for manual driving.

In the manual driving state, an execution icon itself that may be used by the driver is limited, and thus, driver's distraction during driving is blocked. In contrast, in the autonomous driving state, the driver may use all the applications included in the terminal 100 through the vehicle display 251 having a screen.

Figure 6:
FIG. 6 is a view illustrating an embodiment of outputting an execution screen of a music play application according to a control method of FIG. 4.
Figure 6:
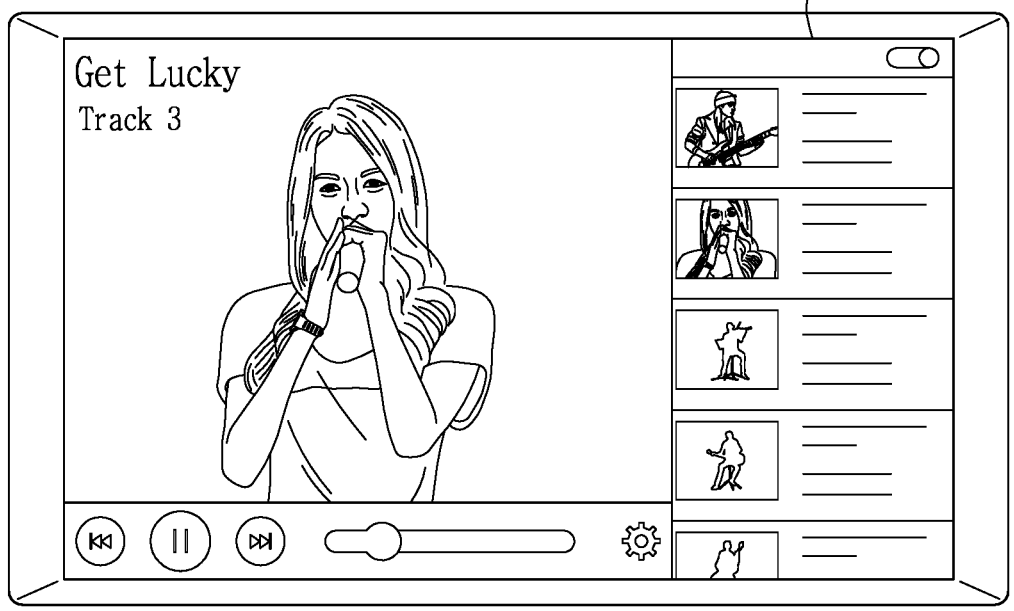

FIG. 6 is a view illustrating an embodiment of outputting an execution screen of a music play application according to a control method of FIG. 4.

Audio and/or video may be played through a music play application. Here, a main agent playing audio and/or video by executing the music play application is the terminal 100 and an execution screen and a sound according to the playing are output through an output unit provided in the vehicle 200.

When a specific audio (e.g., get lucky) is played in the music play application, an execution screen output on the vehicle display 251 may be changed according to a driving state of the vehicle 200. In other words, a user interface output on the vehicle display 251 may be changed according to a driving state.

For example, on the execution screen for manual driving, a total number of output characters is limited, and video may not be displayed or playing of video may be limited. In contrast, on the execution screen for autonomous driving, video corresponding to played audio may be displayed or a graphic object linked to video may be included.

Since types of available content is varied according to a driving state, driver's convenience may be increased and a risk of an accident may be lowered.

Figure 7A:
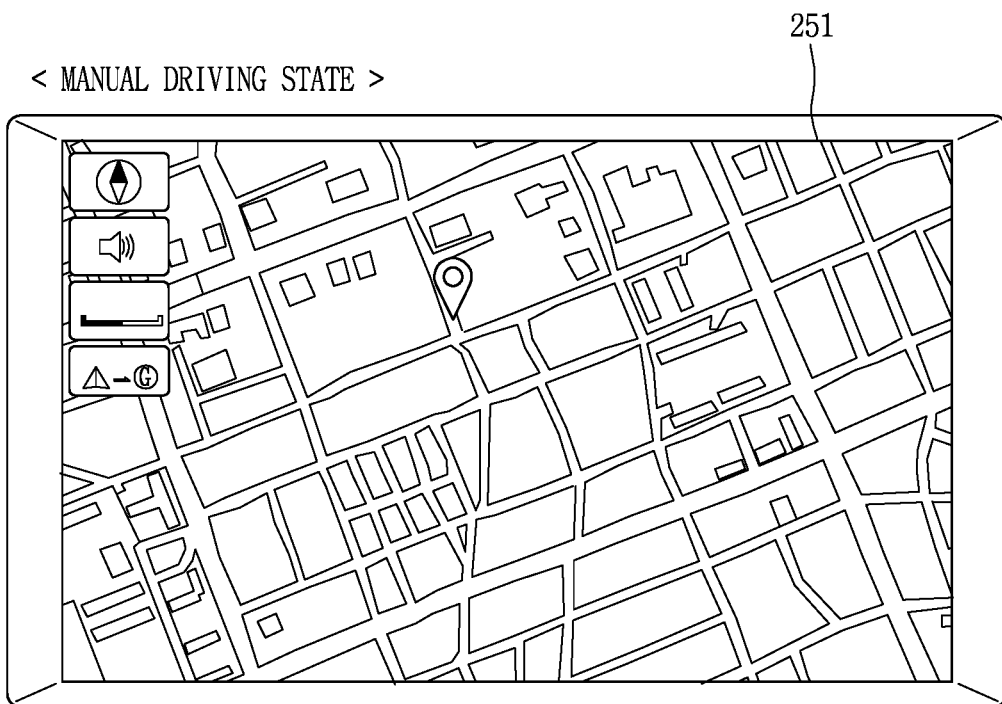
FIGS. 7A to 7C are views illustrating an embodiment of outputting an execution screen of a road guide application according to the control method of FIG. 4.
Figure 7B:
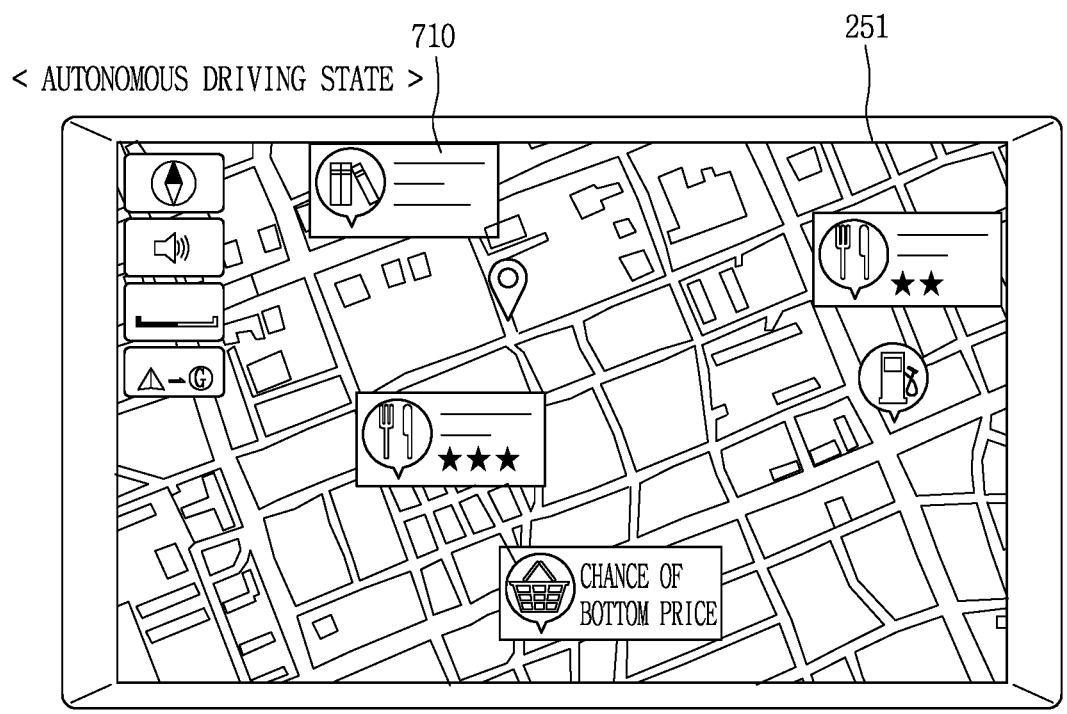
Figure 7C:
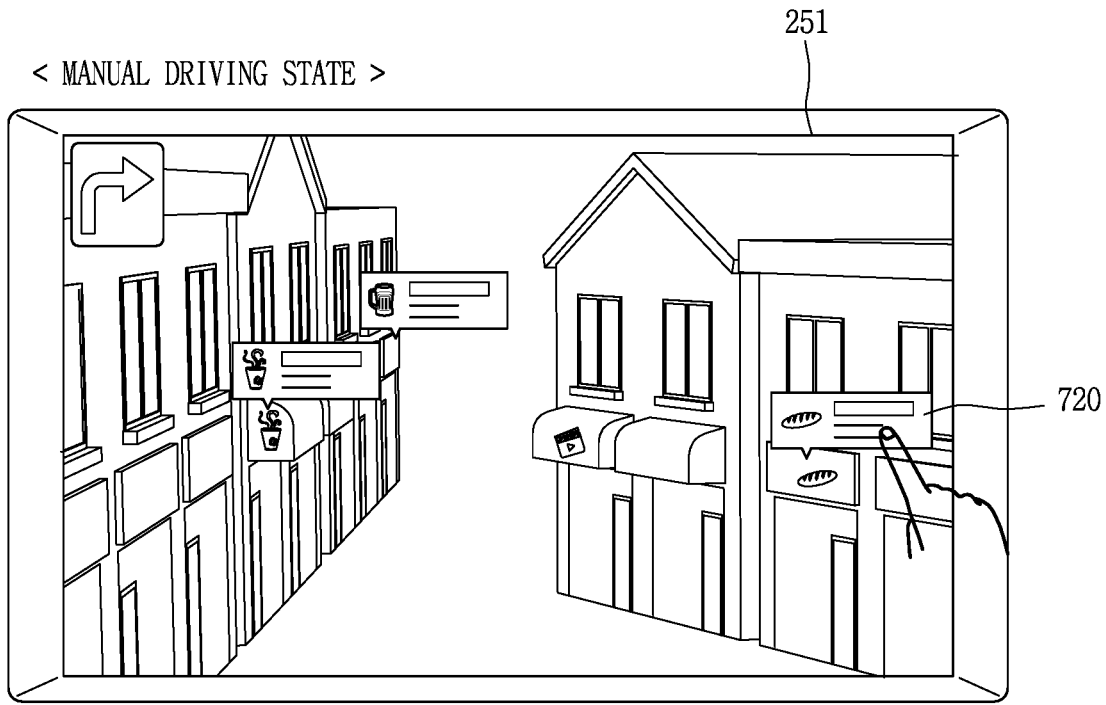
Figure 7C:
Figure 7C:
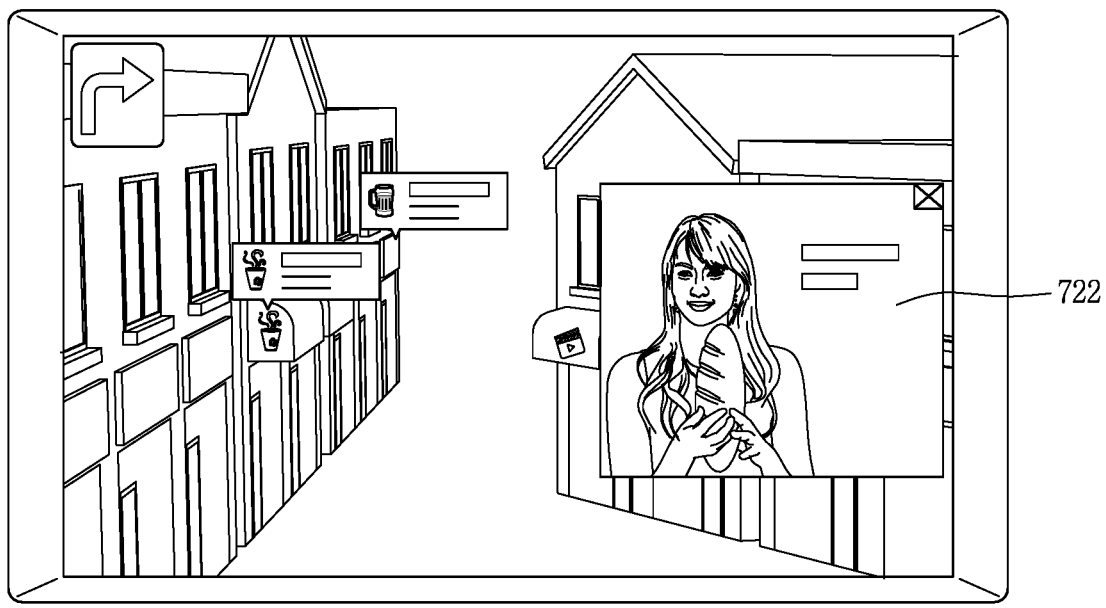

FIGS. 7A to 7C are views illustrating an embodiment of outputting an execution screen of a road guide application according to the control method of FIG. 4.

When the road guide application is executed, a map image and a graphic object guiding a current position of the vehicle 200 on the map image may be included in the execution screen. The driver may set a destination or a stop by using a user interface included in the execution screen. When a destination is set, the execution screen may include guide information guiding a route to reach the destination.

As illustrated in FIG. 7B, the vehicle execution screen for autonomous driving includes a graphic object linked to a video that can be played, and as illustrated in FIG. 7A, the vehicle execution screen for manual driving includes a graphic object linked to a video that can be played.

The video may be an advertisement video and/or an advertisement image guiding a service provided in a building located at a point of the map image. In addition, the graphic object may include an article and/or a type of service provided in the corresponding position, an evaluation of a visitor, discount information, and the like.

The graphic object is not displayed in the manual driving state so that the driver is not distracted, and is displayed in the autonomous driving state.

Meanwhile, compared with the vehicle execution screen for manual driving on which the map image is displayed as illustrated in FIG. 7A, an image captured by a camera provided in the vehicle 200 may be displayed on the vehicle execution screen for autonomous driving as illustrated in FIG. 7C.

In the manual driving state, the driver may be desired to be guided a current position and a route within a range not interfering with driving. In contrast, in the autonomous driving state, the driver may have user needs for being provided with an augmented reality regarding objects positioned in a driving direction.

In order to solve this, a camera is installed to face a front side of the vehicle 200 and the terminal 100 receives an image captured by the camera from the vehicle and implements an augmented reality with the received image.

In a case in which the vehicle 200 is in an autonomous driving state, the terminal 100 generates a virtual image by overlapping a virtual graphic object. In detail, the terminal 100 searches for an object included in the received image and composes a graphic object corresponding to the searched object on the received image. For example, when a bakery is included in the received image, a graphic object 720 including information related to the bakery is composed to the received image.

The graphic object 720 may be linked to a video. When a touch is applied to the graphic object 720, the terminal may play the video linked thereto and transmit a play screen to the vehicle 200. The play screen 722 may be displayed in a region of the virtual image. Accordingly, in the autonomous driving state, the driver may check a front side of a driving direction through the vehicle display 251 and check detailed information regarding an area captured by the camera.

The method for outputting different execution screens on the vehicle display 251 according to driving states of the vehicle 200 has been described with reference to FIGS. 5 to 7C. Hereinafter, a method for outputting different execution screens on the terminal display 151 will be described.

Figure 8A:
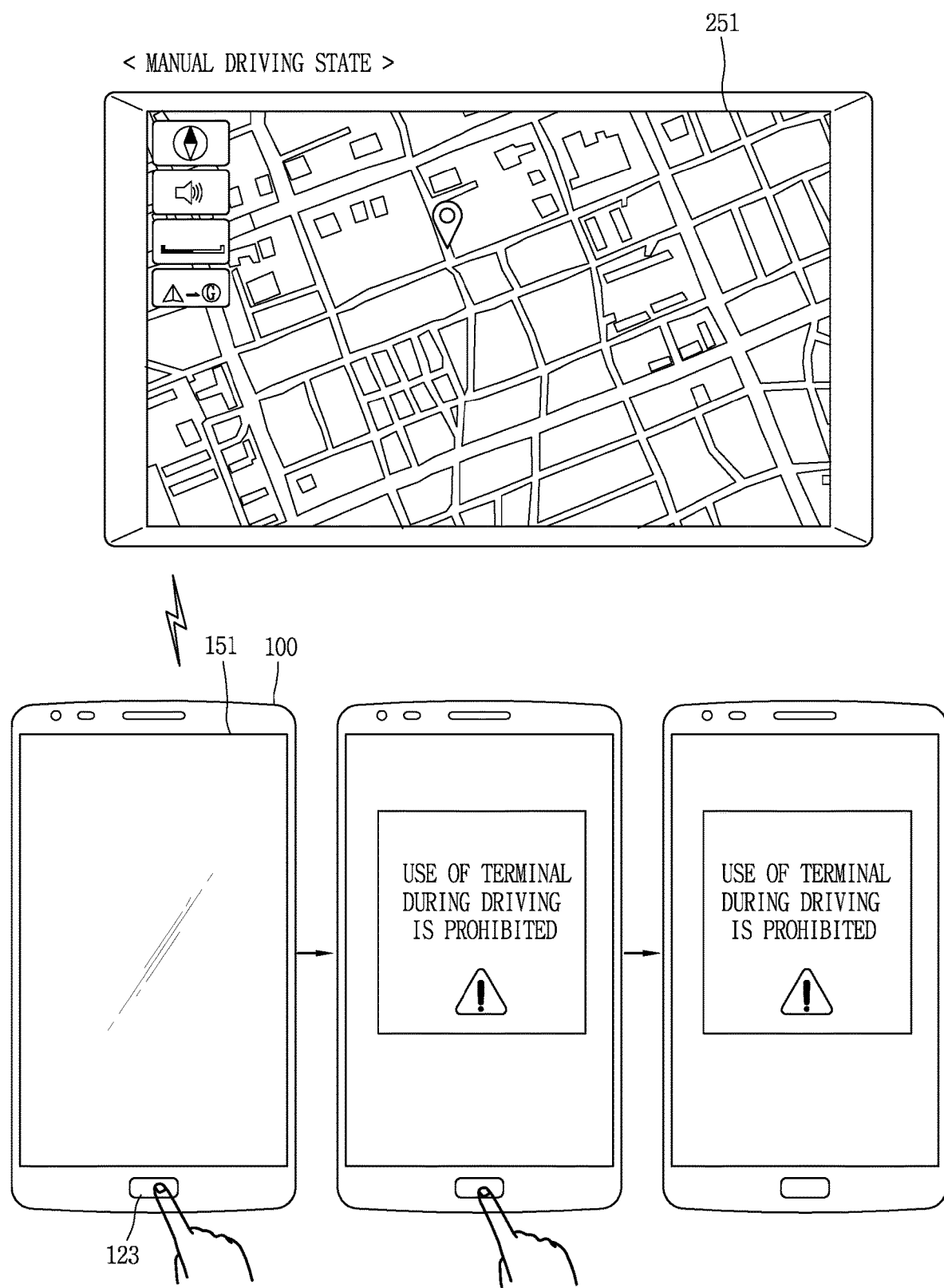
FIGS. 8A and 8B are views illustrating operations of a mobile terminal in a manual driving state.
Figure 8B:
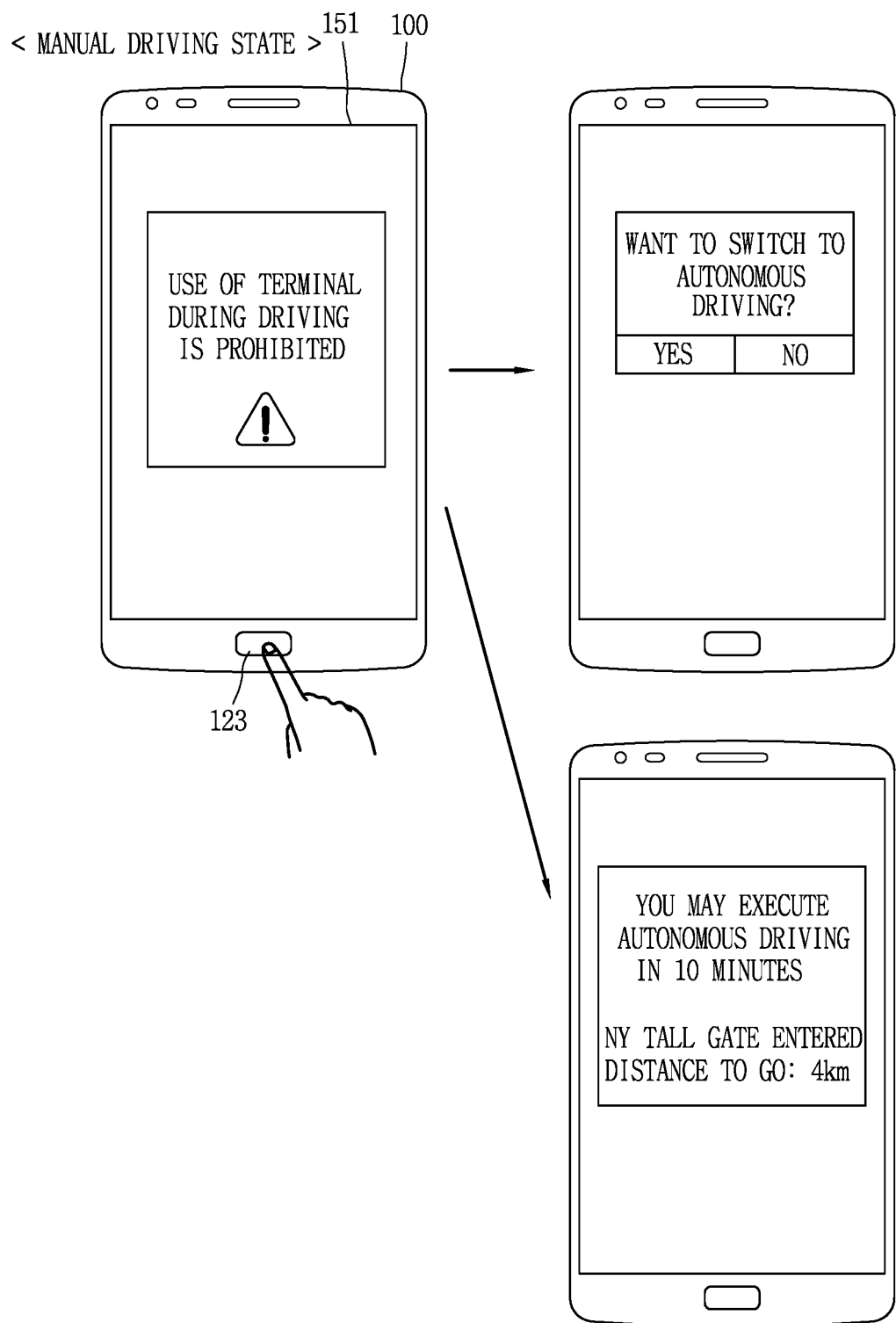

FIGS. 8A and 8B are views illustrating operations of a mobile terminal in a manual driving state.

In the manual driving state, as illustrated in FIG. 8A, the terminal 100 turns off the terminal display 151. This is because the use of the terminal 100 during driving is prohibited.

Even though the terminal display 151 is turned on by a user input, a preset image is displayed on the terminal display 151. In detail, the terminal 100 includes a touch screen including a touch sensor and a display, and when the terminal display 151 is turned on while the vehicle 200 is driving in the manual driving state, the terminal 100 touch-controls such that the preset image is output on the terminal display 151.

In addition, when a user input is applied while the preset image is being output on the terminal display 151, the terminal 100 limits execution of a function corresponding to the user input. For example, when a home button is pressed, a home screen page is to be output, but when the home button is pressed while the vehicle 200 is driving in the manual driving state, output of the home screen page is limited and the preset image is output on the terminal display 151.

Meanwhile, in a case in which a preset condition is met in the manual driving state, the terminal 100 may transmit a driving mode change command to the vehicle 200 such that the manual driving state is switched to the autonomous driving state.

The preset condition may be defined as a case in which it is sensed that the driver has an intention to use the terminal 100 or a case in which the driver is using the terminal 100.

For example, in a case in which the preset condition is met, such as in a case in which the driver gazes at the terminal 100 for a predetermined period of time, in a case in which a user input is applied to the terminal 100, in a case in which the terminal display 151 is turned on, and the like, the terminal may transmit the driving mode change command to the vehicle 200.

The terminal 100 may determine whether the preset condition is met using a sensor provided in the terminal 100 and/or the vehicle 200.

Meanwhile, the terminal 100 may determine whether a driving state of the vehicle 200 may be switched from the manual driving state to the autonomous driving state on the basis of driving information received from the vehicle 200.

When it is determined that the driving state is switchable, the terminal 100 may immediately transmit a driving mode change command to the vehicle 200 or may output a user interface for obtaining a driver's approval regarding the change in the driving mode on the terminal display 151.

For example, as illustrated in FIG. 8B, in a state in which the preset image is being output on the terminal display 151, when the home button is pressed, the terminal 100 may determine whether a driving state is switchable. When the driving state is switchable, the terminal 100 outputs a user interface for receiving an approval for switching to the autonomous driving. In this case, only when the driver approves the switching, the terminal 100 transmits the driving mode change command to the vehicle 200.

When switching is not possible, the terminal 100 may output guide information guiding a timing at which switching is available on the terminal display 151 on the basis of driving information.

A road in which autonomous driving is permitted and a road in which autonomous driving is not permitted may be classified according to regulations. Such a classification may be made on the basis of GPS information included in a map.

In a case in which the vehicle 200 is positioned at a timing t in a road in which autonomous driving is not permitted so mode switching is not possible but the vehicle 200 is scheduled to enter a road in which autonomous driving is permitted after timing x, the terminal may guide the driver that autonomous driving is allowed after the timing x. The guide information may include at least one of information regarding the timing x, information regarding the road that the vehicle 200 is to enter at the timing x, and information regarding a reason why autonomous driving is not possible at the timing t.

FIGS. 9A to 9E are views illustrating operations of a mobile terminal in an autonomous driving state.

In the autonomous driving state, the terminal display 151 may interwork with the vehicle display 251. In detail, regarding the same function, a terminal execution screen may be displayed on the terminal display 151 and a vehicle execution screen for autonomous driving may be displayed on the vehicle display 251.

For example, in a state in which a preset image is output on the terminal display 151 in the manual driving state, when the manual driving state is switched to the autonomous driving state, a terminal execution screen corresponding to a function of the vehicle execution screen output on the vehicle display 251, instead of the preset image, may be output on the terminal display 151.

In a case in which the autonomous driving state that a terminal execution screen is displayed on the terminal display 151 and a vehicle execution screen for autonomous driving is displayed on the vehicle display 251 is switched to the manual driving state, the terminal display 151 may be turned off or a preset image, instead of the terminal execution screen, may be displayed on the terminal display 151. On the vehicle display 251, the vehicle execution screen for autonomous driving is switched to a vehicle execution screen for manual driving.

Meanwhile, when a user input is applied in a state that a terminal execution screen is displayed on the terminal display 151 in the autonomous driving state, the terminal 100 may execute a function corresponding to a user input, and display a new terminal execution screen on the terminal display 151. Also, a new vehicle execution screen for autonomous driving corresponding to the new terminal execution screen may be output on the vehicle display 251.

Figure 9A:
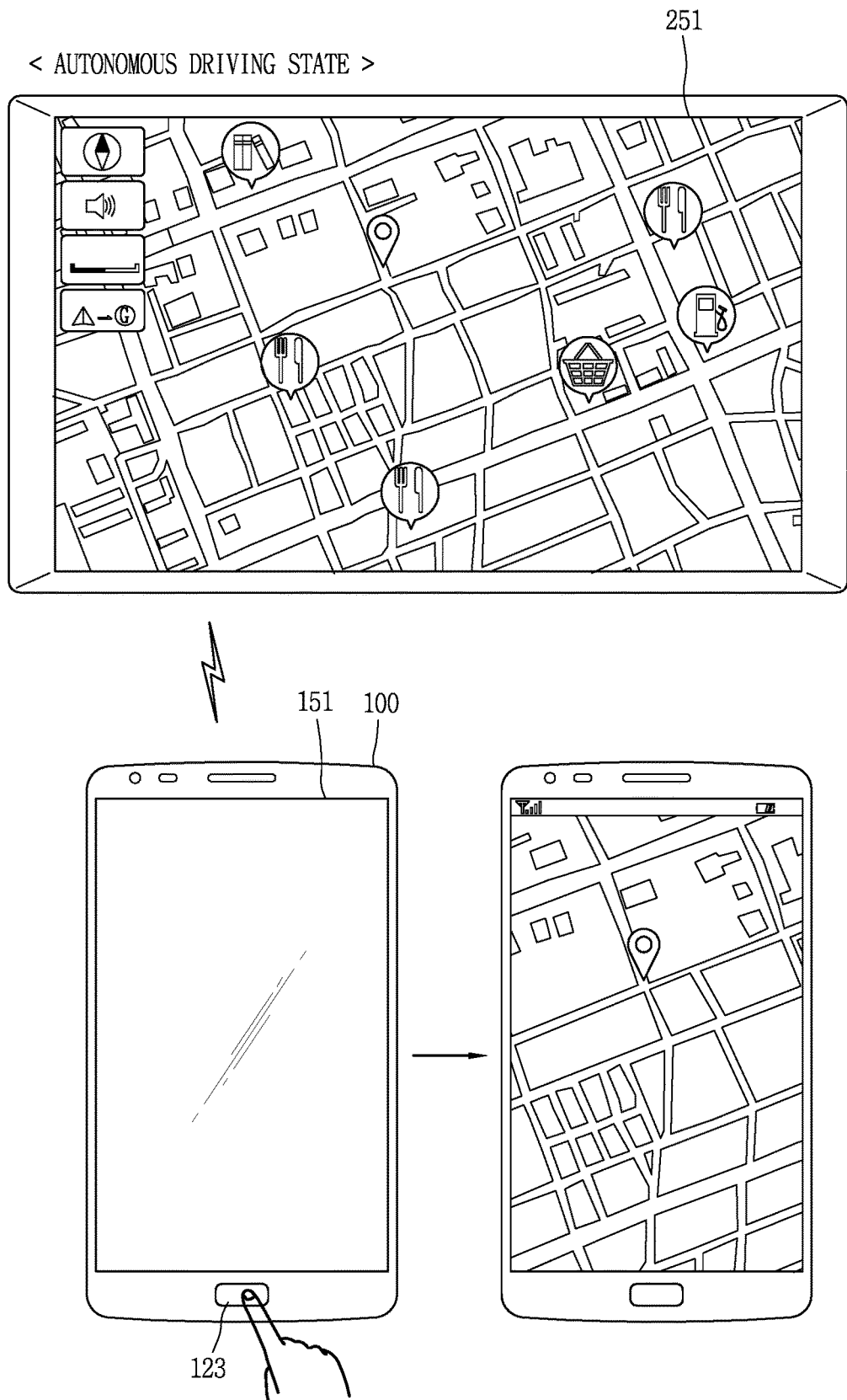
FIGS. 9A to 9E are views illustrating operations of a mobile terminal in an autonomous driving state.
Figure 9B:
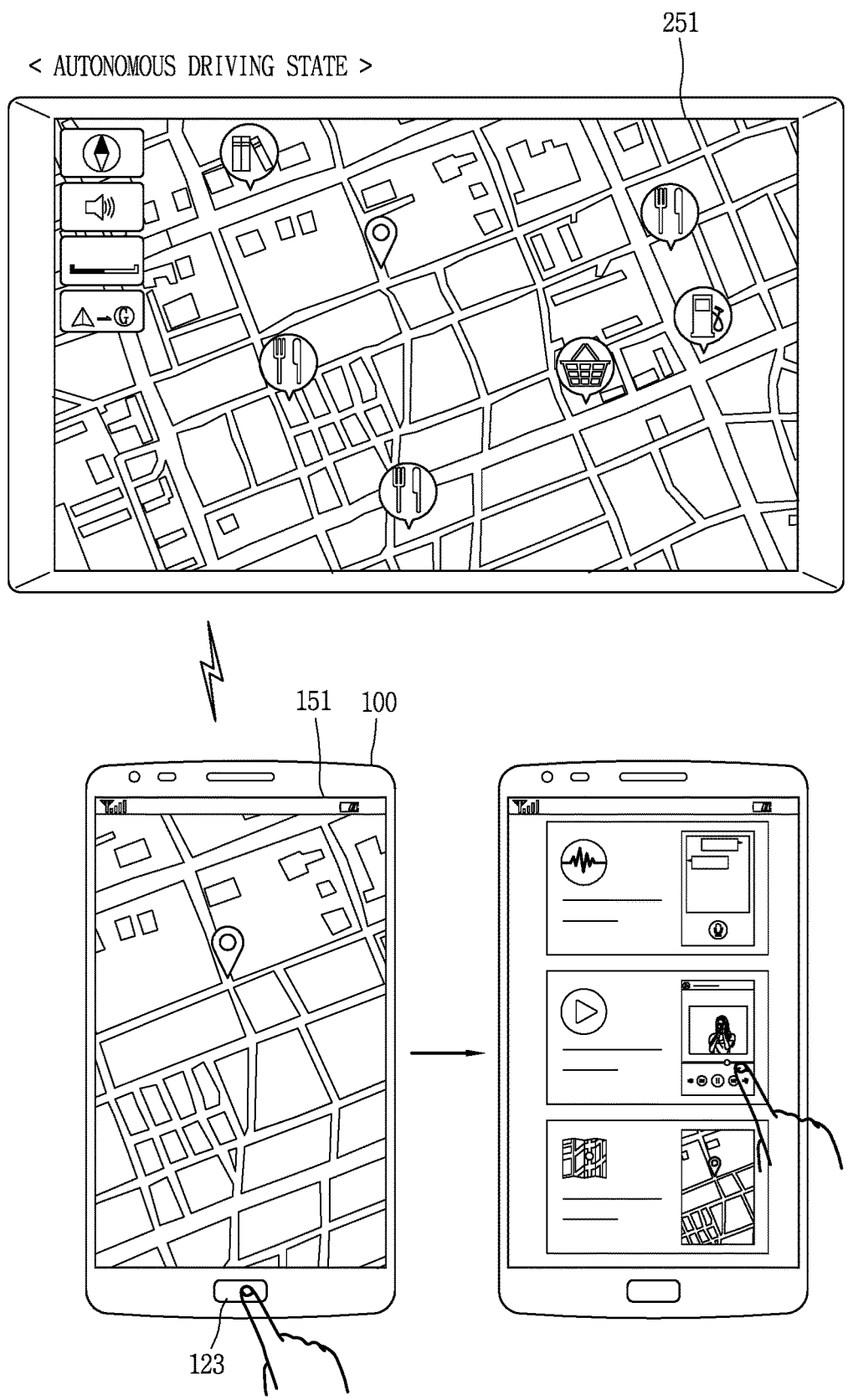
Figure 9C:
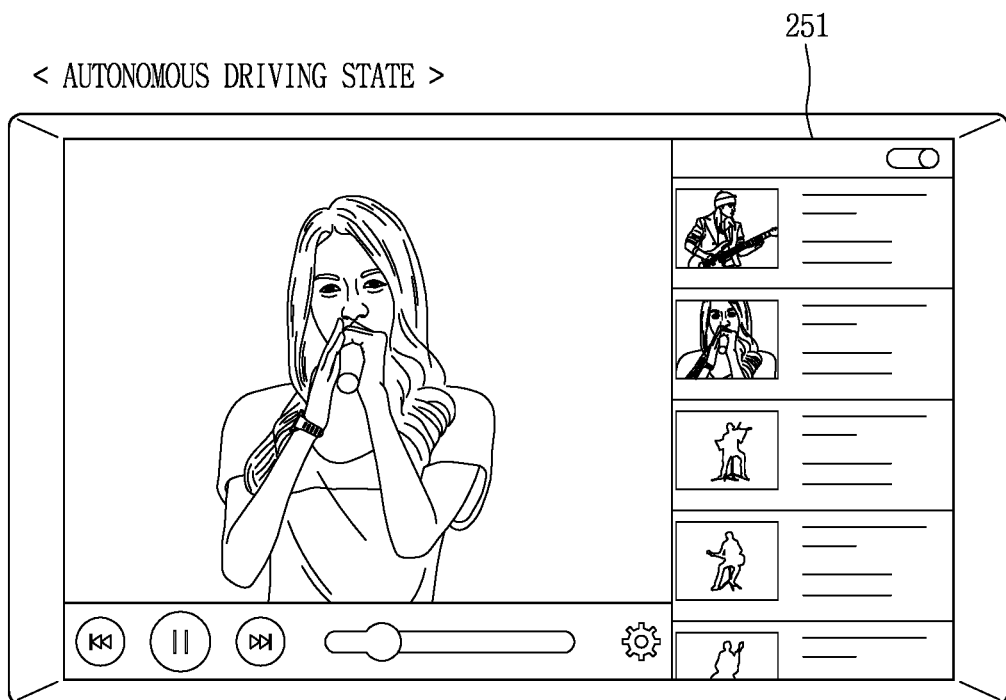
Figure 9C:
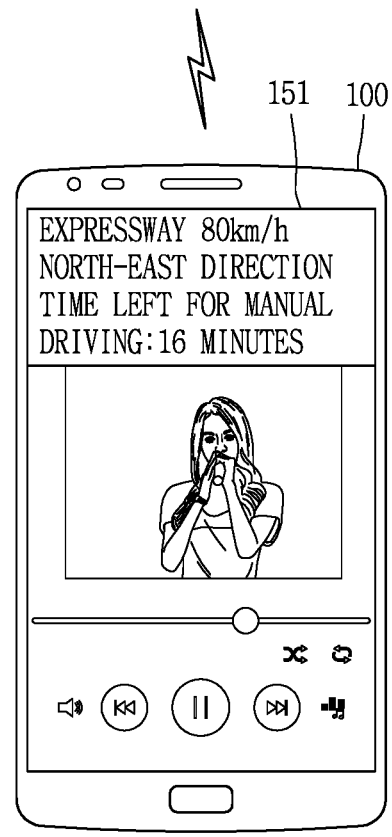

For example, as illustrated in FIG. 9B, in a state in which a map screen is displayed on the terminal display 151 in the autonomous driving state, when the home button is pressed recently executed screens may be displayed on the terminal display 151. When a touch is applied to a recently executed music play execution screen, a vehicle execution screen for autonomous driving for playing video may be output on the vehicle display 251 as illustrated in FIG. 9C.

Meanwhile, when the terminal display 151 is turned on or in an ON state in the autonomous driving state, the terminal 100 stops outputting the preset image. In other words, the preset image is output on the terminal display 151 only in the manual driving state.

Also, the terminal 100 controls the terminal display 151 to display information related to related to driving of the vehicle 200 in the autonomous driving state on at least one region of the terminal display 151. The information related to driving may be generated on the basis of driving information transmitted from the vehicle 200.

The information related to driving may include information related to autonomous driving such as an object with which the vehicle may collide, a possibility of collision, and a level at which the driver is required to intervene, as well as general information such as a vehicle speed, a driving direction, or a destination.

In addition, when the autonomous driving is scheduled to be switched to the manual driving, at least one of a time left and a distance to go for switching may be included in the information related to driving. For example, as illustrated in FIG. 9C, in a case in which the vehicle 200 is driving on a road in which autonomous driving is allowed but the vehicle 200 is scheduled to enter a road in which the vehicle 200 is to perform manual driving in 16 minutes, at least one of a time left and a distance to go for switching in the manual driving may be displayed on the terminal display 151.

Figure 9D:
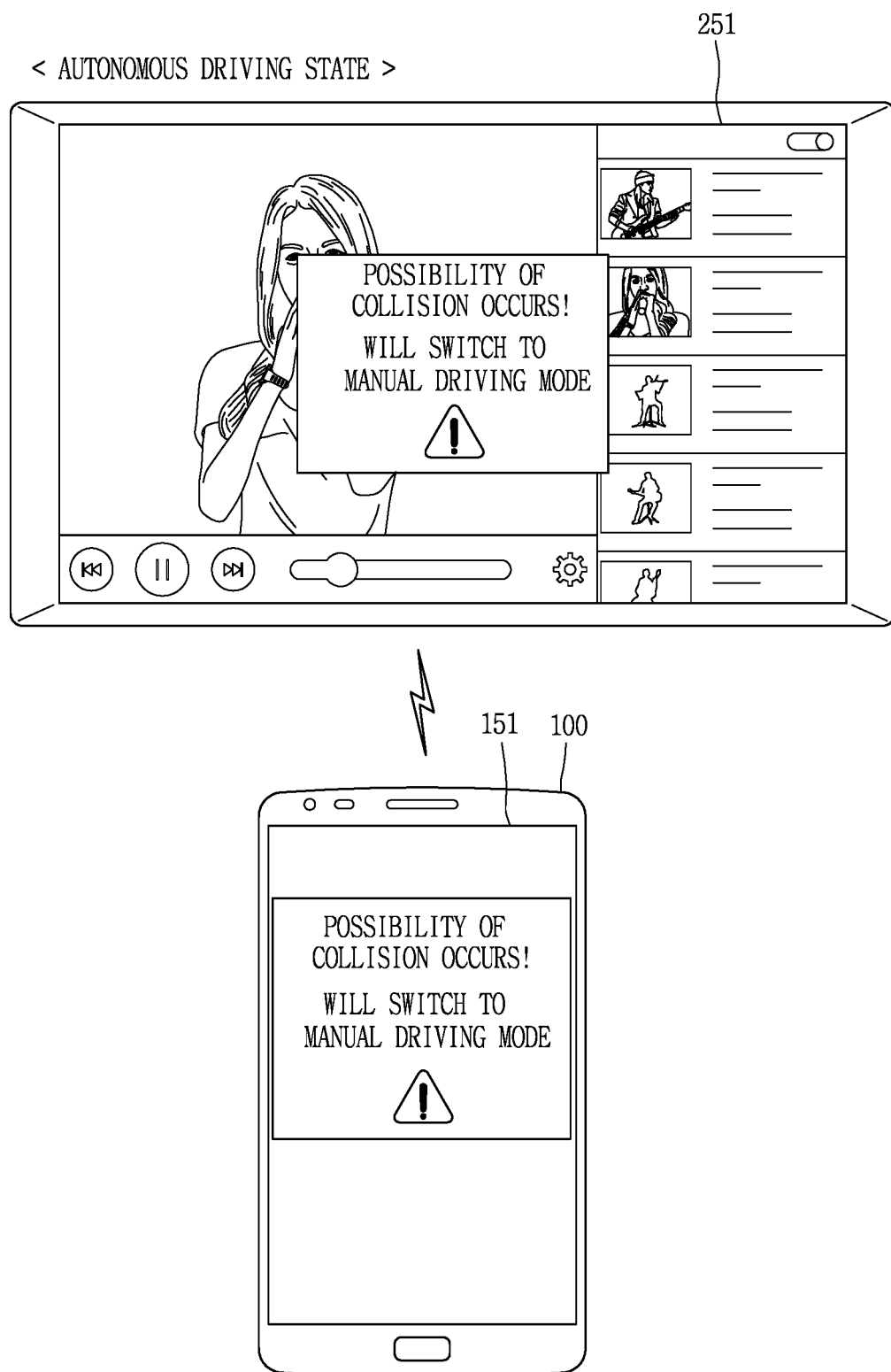

Meanwhile, as illustrated in FIG. 9D, in a case in which the driver is to intervene in driving, the autonomous driving state is switched to the manual driving state. Here, notification information indicating switching to the manual driving state may be displayed on at least one of the terminal display 151 and the vehicle display 251.

When the driver who has used the terminal 100 in the autonomous driving state checks the notification information displayed on the terminal display 151, the driver may immediately intervene the driving to perform driving to prevent an accident.

Figure 9E:
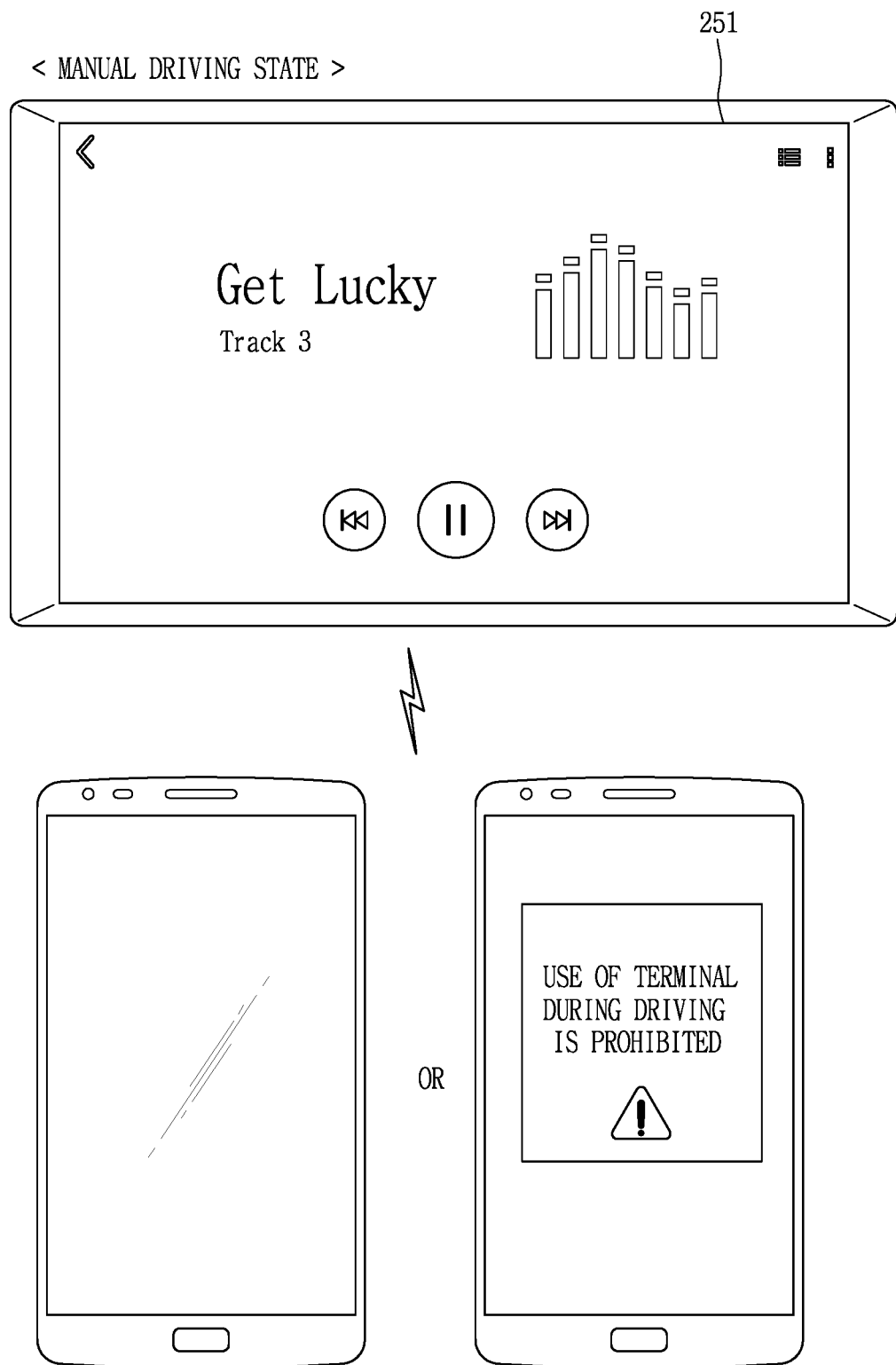

After the notification information is output for a predetermined period of time, as illustrated in FIG. 9E, a vehicle execution screen for manual driving may be displayed on the vehicle display 251 and the terminal display 151 may be turned off or a preset image may be displayed on the terminal display 151 in an ON state. Thus, the driver may concentrate on driving again.

Figure 10:
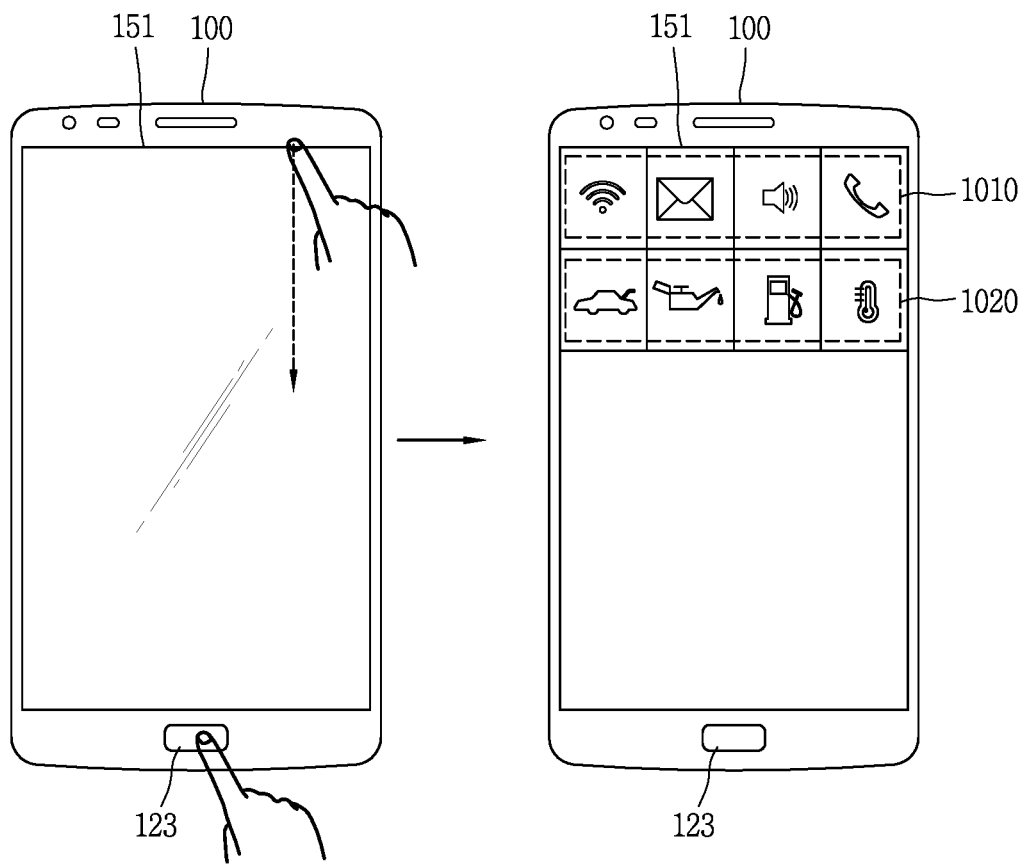
FIG. 10 is a conceptual view illustrating a user interface added to a mobile terminal in an autonomous driving state.

FIG. 10 is a conceptual view illustrating a user interface added to a mobile terminal in an autonomous driving state.

The terminal 100 may output a graphic object associated with a control function of the vehicle 200 on the terminal display 151 in the autonomous driving state.

For example, in a case in which a drag input is applied from one end of the terminal display 151 to the other end thereof, a curtain window appearing at stages may be output along the drag input on the terminal display 151. A graphic object associated with a control function of the terminal 100 may be displayed in a first region 1010 of the curtain window, and a graphic object associated with a control function of the vehicle 200 may be displayed in a second region 1020. The drive may operate the vehicle 200, as well as operating the terminal 100, using the terminal 100.

FIG. 11 is a conceptual view illustrating a mobile terminal which divides an autonomous driving state into a plurality of modes and performs different operations according to respective modes.

The autonomous driving state is divided into a plurality of phases, and a different execution screen may be output on the vehicle display 251 in each phase. For example, when the autonomous driving state corresponds to a first phase, a first phase execution screen corresponding to the first phase may be selected, and when the autonomous driving state corresponds to a second phase, a second phase execution screen corresponding to the second phase may be selected.

In addition, authority to use the terminal 100 may be varied according to the respective phases of the autonomous driving state. A list of functions that may be executed in the terminal 100 may be varied according to each phase, and types of content (or types of user interface) displayed on the terminal display 151 may be varied.

Terms are defined before describing each phase.

Hands-on refers to a situation in which a driver's hand should not be away from a steering wheel for a period of time longer than a first reference time, that is, a situation in which the driver should hold the steering wheel and operate a driving direction of the vehicle 200. Hands-off refers to a situation in which a driving direction of the vehicle is adjusted by a program although the driver does not operate the steering wheel.

Feet-on refers to a situation in which a driver's foot should not be away from an acceleration pedal for a period of time longer than a second reference time, that is, a situation in which the driver should press the acceleration pedal to accelerate the vehicle 200. Feet-off refers to a situation in which acceleration of the vehicle is adjusted by a program although the driver does not press the acceleration pedal.

Eye-on refers to a situation in which driver's eyes should turn to the outside of a wind shield, and eye-off refers to a situation in which the driver may close his eyes for a period of time longer than a third reference time. That is, in the case of eye-off, both acceleration and driving direction of the vehicle are adjusted by a program.

In the first phase, the use of the terminal 100 is prohibited. Thus, when a user input is applied to the terminal 100, a preset image is output on the terminal display 151. A first phase execution screen corresponding to the first phase may be displayed on the vehicle display 251.

In the second phase, authority regarding the terminal 100 is set to a first level. In the terminal 100, only functions set to the first level may be limitedly executed. A second phase execution screen corresponding to the second phase may be displayed on the vehicle display 251.

In the third phase, authority regarding the terminal 100 is set to a second level. Functions set to the first level and functions se to the second level may be executed.

Finally, in the fourth phase, the driver may use all the functions of the terminal 100.

The autonomous driving state may be divided into a plurality of phases, and since operations of the terminal 100 and the vehicle 200 are different according to the respective phases, the driver may be provided with a user interface optimized to a driving state. Since an optimized user interface is provided within a range in which safety is maintained, the driver may conveniently use the terminal 100 and the vehicle 200.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a communication unit configured to communicate with a vehicle system that includes a vehicle display; and
a controller configured to:
receive, from the vehicle system via the communication unit, driving information that describes status of a vehicle or a surrounding environment of the vehicle;
select any one screen, among a plurality of screens with respect to an application executed in the mobile terminal, based on the driving information, different screens are selected according to the driving information when user input information is received; and
provide, to the vehicle system through the communication unit, the selected screen for displaying on the vehicle display,
wherein a first screen of the application is selected when the vehicle operates in a manual driving state and a second screen of the application is selected when the vehicle operates in an autonomous driving state, and
wherein the controller is configured to, based on a driving state of the vehicle being scheduled to be switched between the autonomous driving state and the manual driving state, output a time left to switch the driving state of the vehicle or a distance that the vehicle will move during the time left, the time left comprising:
a first time left to switch the driving state of the vehicle from the autonomous driving state to the manual driving state, the first time left being displayed on the second screen, and
a second time left to switch the driving state of the vehicle from the manual driving state to the autonomous driving state, the second time left being displayed on the first screen.

2. The mobile terminal of claim 1, wherein the second screen includes vehicle information related to at least one of a driving speed and a driving direction, and
wherein the first screen does not include the vehicle information.

3. The mobile terminal of claim 1, wherein the autonomous driving state indicates a state of one or more computers of the vehicle system that are configured to control an acceleration of the vehicle or a moving direction of the vehicle.

4. The mobile terminal of claim 1, wherein the driving information includes a current speed of the vehicle, a driving direction of the vehicle, a possibility of collision against an object, characteristics of a road on which the vehicle operates, location information of the vehicle, one or more images of a surrounding environment of the vehicle, navigation information of the vehicle, driver information, passenger information, or driving state information.

5. The mobile terminal of claim 1, further comprising:
a touch screen including a touch sensor and a display, wherein the controller is configured to:
control the touch screen to output a preset image when the display of the touch screen is turned on while the vehicle operates in the manual driving state, and
control the touch screen to output a third screen instead of the preset image when the manual driving state is switched to the autonomous driving state.

6. The mobile terminal of claim 5, wherein the controller is configured to, based on the driving state of the vehicle being scheduled to be switched from the autonomous driving state to the manual driving state, control the touch screen to output the first time left or a first distance for the switching that the vehicle will move during the first time left.

7. The mobile terminal of claim 5, wherein the controller is configured to control the touch screen to output a graphic object associated with a control function of the vehicle system when the vehicle is in the autonomous driving state.

8. The mobile terminal of claim 1, wherein the controller is configured to:
transmit a signal to the vehicle system through the communication unit for changing the driving state of the vehicle when a user input is applied to the mobile terminal while the vehicle operates in the manual driving state such that the manual driving state is switched to the autonomous driving state.

9. The mobile terminal of claim 8, wherein the controller is configured to, based on switching from the manual driving state to the autonomous driving state being unavailable at a time point, control the touch screen to output guide information that shows when the switching from the manual driving state to the autonomous driving state is available.

10. The mobile terminal of claim 1, wherein the controller is configured to, based on the driving state of the vehicle corresponding to the manual driving state, output the second time left to be displayed on the first screen in response to receiving the user input information.

11. The mobile terminal of claim 1, wherein the controller is configured to, based on the driving state of the vehicle corresponding to the autonomous driving state, output the first time left to be displayed on the second screen, the first time left overlapping a content displayed on the second screen.

12. A mobile terminal comprising:
a display;
a communication unit capable of communicating with a vehicle system; and
a controller configured to:
receive, from the vehicle system via the communication unit, driving information that describes status of a vehicle or a surrounding environment of the vehicle;
in response to occurrence of an event that the display is turned on, select any one screen, among a plurality of screens with respect to the event, based on the driving information, different screens are selected according to the driving information when the event is occurred; and
control the display to display the selected screen,
wherein a first screen of the event is selected when the vehicle operates in a manual driving state and a second screen of the event is selected when the vehicle operates in an autonomous driving state,
wherein the first screen is configured to limit execution of at least one application stored in the mobile terminal,
wherein the second screen is an execution screen of the application, and
wherein the controller is configured to, based on a driving state of the vehicle being scheduled to be switched between the autonomous driving state and the manual driving state, output a time left to switch the driving state of the vehicle or a distance that the vehicle will move during the time left, the time left comprising:
a first time left to switch the driving state of the vehicle from the autonomous driving state to the manual driving state, the first time left being displayed on the second screen, and
a second time left to switch the driving state of the vehicle from the manual driving state to the autonomous driving state, the second time left being displayed on the first screen.

13. The mobile terminal of claim 12, wherein the second screen further includes a first distance that the vehicle will move during the first time left.

14. The mobile terminal of claim 12, wherein the controller is configured to:
in response to a user input received while the first screen is being displayed, transmit, via the communication unit to the vehicle system, a driving mode change command such that the manual driving state is switched to the autonomous driving state.

15. The mobile terminal of claim 14, wherein the controller is configured to:
provide, on the display, guide information that indicates a timing at which switching the driving state of the vehicle is available based on the driving information.

16. The mobile terminal of claim 12, wherein the controller is further configured to:
turn off the display when the display is turned on while the vehicle system operates in the manual driving state.

17. The mobile terminal of claim 12, wherein the second screen includes a graphic object associated with a control function of the vehicle system, and
wherein the controller is further configured to transmit, via the communication unit to the vehicle system, a control command for performing the control function of the vehicle system in response to a touch input applied to the graphic object.

18. The mobile terminal of claim 12, wherein the controller is configured to:
transmit a signal to the vehicle system through the communication unit for changing a driving state of the vehicle when a user input is applied to the mobile terminal while the vehicle operates in the manual driving state such that the manual driving state is switched to the autonomous driving state.

19. The mobile terminal of claim 18, wherein the controller is configured to, based on switching from the manual driving state to the autonomous driving state being unavailable at a time point, output guide information that shows when the switching from the manual driving state to the autonomous driving state is available.

20. The mobile terminal of claim 12, wherein the controller is configured to:
- based on the driving state of the vehicle corresponding to the manual driving state, output the second time left to be displayed on the first screen in response to receiving the user input information; and
- based on the driving state of the vehicle corresponding to the autonomous driving state, output the first time left to be displayed on the second screen, the first time left overlapping a content displayed on the second screen.

* * * * *